United States Patent
Ma et al.

(10) Patent No.: US 11,763,266 B2
(45) Date of Patent: Sep. 19, 2023

(54) SMART PARKING LOT SYSTEM

(71) Applicant: Johnson Controls Tyco IP Holdings LLP, Milwaukee, WI (US)

(72) Inventors: Ada L. Ma, Kenmore, WA (US); Sudhi R. Sinha, Milwaukee, WI (US); Erik S. Paulson, Madison, WI (US); Elyse R. Hobson, Milwaukee, WI (US); Youngchoon Park, Brookfield, WI (US); Justin J. Ploegert, Cudahy, WI (US); Sarah Just, Milwaukee, WI (US); Daniel Kass, Milwaukee, WI (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 0 days.

(21) Appl. No.: 17/391,811

(22) Filed: Aug. 2, 2021

(65) Prior Publication Data
US 2021/0365894 A1 Nov. 25, 2021

Related U.S. Application Data

(63) Continuation of application No. 16/746,453, filed on Jan. 17, 2020, now Pat. No. 11,132,649.
(Continued)

(51) Int. Cl.
*H04N 5/44* (2011.01)
*G06Q 10/1093* (2023.01)
(Continued)

(52) U.S. Cl.
CPC ......... *G06Q 10/1095* (2013.01); *G05B 15/02* (2013.01); *G05B 19/042* (2013.01);
(Continued)

(58) Field of Classification Search
CPC ......... G06Q 10/1095; G06Q 10/06398; G06Q 10/087; G06Q 10/10; G06Q 30/0633;
(Continued)

(56) References Cited

U.S. PATENT DOCUMENTS

| 5,301,109 A | 4/1994 | Landauer et al. |
| 5,446,677 A | 8/1995 | Jensen et al. |

(Continued)

FOREIGN PATENT DOCUMENTS

| AU | 2019226217 A1 | 11/2020 |
| AU | 2019226264 A1 | 11/2020 |

(Continued)

OTHER PUBLICATIONS

International Search Report and Written Opinion on PCT/US2017/013647, dated Apr. 18, 2017, 10 pages.
(Continued)

*Primary Examiner* — Munear T Akki
(74) *Attorney, Agent, or Firm* — Foley & Lardner LLP

(57) ABSTRACT

One or more non-transitory computer-readable storage media having instructions stored thereon that, when executed by one or more processors, cause the one or more processors to detect a vehicle that enters into a parking lot, identify an individual associated with the vehicle, retrieve context information corresponding to the individual, dynamically determine a first parking space based on the context information and available parking spaces, and provide the individual with directions to the first parking space.

18 Claims, 11 Drawing Sheets

Related U.S. Application Data

(60) Provisional application No. 62/794,370, filed on Jan. 18, 2019, provisional application No. 62/794,535, filed on Jan. 18, 2019, provisional application No. 62/794,393, filed on Jan. 18, 2019, provisional application No. 62/794,357, filed on Jan. 18, 2019, provisional application No. 62/794,502, filed on Jan. 18, 2019, provisional application No. 62/794,415, filed on Jan. 18, 2019, provisional application No. 62/794,533, filed on Jan. 18, 2019, provisional application No. 62/794,032, filed on Jan. 18, 2019, provisional application No. 62/794,389, filed on Jan. 18, 2019, provisional application No. 62/794,348, filed on Jan. 18, 2019, provisional application No. 62/794,407, filed on Jan. 18, 2019, provisional application No. 62/794,489, filed on Jan. 18, 2019, provisional application No. 62/794,276, filed on Jan. 18, 2019.

(51) Int. Cl.
| | |
|---|---|
| *G06Q 30/0601* | (2023.01) |
| *G06F 9/451* | (2018.01) |
| *G06F 16/28* | (2019.01) |
| *G06F 16/248* | (2019.01) |
| *G06F 16/25* | (2019.01) |
| *H04L 9/32* | (2006.01) |
| *G07C 9/37* | (2020.01) |
| *G06Q 10/10* | (2023.01) |
| *G07C 9/00* | (2020.01) |
| *G05B 19/042* | (2006.01) |
| *G05B 23/02* | (2006.01) |
| *G06Q 10/087* | (2023.01) |
| *G06F 16/901* | (2019.01) |
| *G06Q 10/0639* | (2023.01) |
| *G08G 1/14* | (2006.01) |
| *G07C 9/27* | (2020.01) |
| *G07C 9/21* | (2020.01) |
| *G07C 9/22* | (2020.01) |
| *G07C 9/23* | (2020.01) |
| *G07C 9/25* | (2020.01) |
| *G07C 9/28* | (2020.01) |
| *G06V 20/52* | (2022.01) |
| *G06V 20/58* | (2022.01) |
| *G06V 40/10* | (2022.01) |
| *G07C 9/20* | (2020.01) |
| *G05B 15/02* | (2006.01) |
| *G06Q 50/26* | (2012.01) |
| *G06V 20/62* | (2022.01) |

(52) U.S. Cl.
CPC ......... *G05B 23/0218* (2013.01); *G06F 9/451* (2018.02); *G06F 16/248* (2019.01); *G06F 16/252* (2019.01); *G06F 16/288* (2019.01); *G06F 16/9024* (2019.01); *G06Q 10/06398* (2013.01); *G06Q 10/087* (2013.01); *G06Q 10/10* (2013.01); *G06Q 30/0633* (2013.01); *G06V 20/52* (2022.01); *G06V 20/586* (2022.01); *G06V 40/103* (2022.01); *G07C 9/00563* (2013.01); *G07C 9/21* (2020.01); *G07C 9/215* (2020.01); *G07C 9/22* (2020.01); *G07C 9/23* (2020.01); *G07C 9/253* (2020.01); *G07C 9/27* (2020.01); *G07C 9/28* (2020.01); *G07C 9/37* (2020.01); *G08G 1/142* (2013.01); *G08G 1/148* (2013.01); *G08G 1/149* (2013.01); *H04L 9/3247* (2013.01); *G05B 2219/25011* (2013.01); *G06Q 50/26* (2013.01); *G06V 20/625* (2022.01)

(58) Field of Classification Search
CPC .. G06Q 50/26; G05B 19/042; G05B 23/0218; G05B 2219/25011; G06F 9/451; G06F 16/248; G06F 16/252; G06F 16/288; G06F 16/9024; G06V 20/52; G06V 20/586; G06V 40/103; G06V 20/625; G07C 9/00563; G07C 9/21; G07C 9/22; G07C 9/23; G07C 9/253; G07C 9/27; G07C 9/28; G07C 9/37; G08G 1/142; G08G 1/148; G08G 1/149; H04L 9/3247
See application file for complete search history.

(56) References Cited

U.S. PATENT DOCUMENTS

| | | |
|---|---|---|
| 5,581,478 A | 12/1996 | Cruse et al. |
| 5,812,962 A | 9/1998 | Kovac |
| 5,960,381 A | 9/1999 | Singers et al. |
| 5,973,662 A | 10/1999 | Singers et al. |
| 6,014,612 A | 1/2000 | Larson et al. |
| 6,031,547 A | 2/2000 | Kennedy |
| 6,134,511 A | 10/2000 | Subbarao |
| 6,157,943 A | 12/2000 | Meyer |
| 6,285,966 B1 | 9/2001 | Brown et al. |
| 6,363,422 B1 | 3/2002 | Hunter et al. |
| 6,385,510 B1 | 5/2002 | Hoog et al. |
| 6,389,331 B1 | 5/2002 | Jensen et al. |
| 6,401,027 B1 | 6/2002 | Xu et al. |
| 6,437,691 B1 | 8/2002 | Sandelman et al. |
| 6,477,518 B1 | 11/2002 | Li et al. |
| 6,487,457 B1 | 11/2002 | Hull et al. |
| 6,493,755 B1 | 12/2002 | Hansen et al. |
| 6,577,323 B1 | 6/2003 | Jamieson et al. |
| 6,626,366 B2 | 9/2003 | Kayahara et al. |
| 6,646,660 B1 | 11/2003 | Patty |
| 6,704,016 B1 | 3/2004 | Oliver et al. |
| 6,732,540 B2 | 5/2004 | Sugihara et al. |
| 6,764,019 B1 | 7/2004 | Kayahara et al. |
| 6,782,385 B2 | 8/2004 | Natsumeda et al. |
| 6,813,532 B2 | 11/2004 | Eryurek et al. |
| 6,816,811 B2 | 11/2004 | Seem |
| 6,823,680 B2 | 11/2004 | Jayanth |
| 6,826,454 B2 | 11/2004 | Sulfstede |
| 6,865,511 B2 | 3/2005 | Frerichs et al. |
| 6,925,338 B2 | 8/2005 | Eryurek et al. |
| 6,986,138 B1 | 1/2006 | Sakaguchi et al. |
| 7,031,880 B1 | 4/2006 | Seem et al. |
| 7,401,057 B2 | 7/2008 | Eder |
| 7,552,467 B2 | 6/2009 | Lindsay |
| 7,627,544 B2 | 12/2009 | Chkodrov et al. |
| 7,818,249 B2 | 10/2010 | Lovejoy et al. |
| 7,889,051 B1 | 2/2011 | Billig et al. |
| 7,996,488 B1 | 8/2011 | Casabella et al. |
| 8,078,330 B2 | 12/2011 | Brickfield et al. |
| 8,104,044 B1 | 1/2012 | Scofield et al. |
| 8,180,663 B2 | 5/2012 | Tischhauser et al. |
| 8,229,470 B1 | 7/2012 | Ranjan et al. |
| 8,346,589 B1 | 1/2013 | Norton et al. |
| 8,401,991 B2 | 3/2013 | Wu et al. |
| 8,495,745 B1 | 7/2013 | Schrecker et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,629,755 B2 | 1/2014 | Hashim-Waris |
| 8,635,182 B2 | 1/2014 | MacKay |
| 8,682,921 B2 | 3/2014 | Park et al. |
| 8,731,724 B2 | 5/2014 | Drees et al. |
| 8,737,334 B2 | 5/2014 | Ahn et al. |
| 8,738,334 B2 | 5/2014 | Jiang et al. |
| 8,751,487 B2 | 6/2014 | Byrne et al. |
| 8,788,097 B2 | 7/2014 | Drees et al. |

(56) References Cited

U.S. PATENT DOCUMENTS

| | | |
|---|---|---|
| 8,805,995 B1 | 8/2014 | Oliver |
| 8,843,238 B2 | 9/2014 | Wenzel et al. |
| 8,874,071 B2 | 10/2014 | Sherman et al. |
| 8,907,803 B2 | 12/2014 | Martin |
| 8,941,465 B2 | 1/2015 | Pineau et al. |
| 8,990,127 B2 | 3/2015 | Taylor |
| 9,070,113 B2 | 6/2015 | Shafiee et al. |
| 9,116,978 B2 | 8/2015 | Park et al. |
| 9,185,095 B1 | 11/2015 | Moritz et al. |
| 9,189,527 B2 | 11/2015 | Park et al. |
| 9,196,009 B2 | 11/2015 | Drees et al. |
| 9,202,322 B2 | 12/2015 | Kappeler et al. |
| 9,229,966 B2 | 1/2016 | Aymeloglu et al. |
| 9,286,582 B2 | 3/2016 | Drees et al. |
| 9,311,807 B2 | 4/2016 | Schultz et al. |
| 9,344,751 B1 | 5/2016 | Ream et al. |
| 9,354,968 B2 | 5/2016 | Wenzel et al. |
| 9,507,686 B2 | 11/2016 | Horn et al. |
| 9,524,594 B2 | 12/2016 | Ouyang et al. |
| 9,558,196 B2 | 1/2017 | Johnston et al. |
| 9,576,255 B2 | 2/2017 | Kalb et al. |
| 9,652,813 B2 | 5/2017 | Gifford et al. |
| 9,666,075 B2 | 5/2017 | Davies et al. |
| 9,753,455 B2 | 9/2017 | Drees |
| 9,811,249 B2 | 11/2017 | Chen et al. |
| 9,838,844 B2 | 12/2017 | Emeis et al. |
| 9,886,478 B2 | 2/2018 | Mukherjee |
| 9,948,359 B2 | 4/2018 | Horton |
| 9,955,318 B1 | 4/2018 | Scheper et al. |
| 10,055,114 B2 | 8/2018 | Shah et al. |
| 10,055,206 B2 | 8/2018 | Park et al. |
| 10,116,461 B2 | 10/2018 | Fairweather et al. |
| 10,154,138 B2 | 12/2018 | Te Booij et al. |
| 10,169,454 B2 | 1/2019 | Ait-Mokhtar et al. |
| 10,171,297 B2 | 1/2019 | Stewart et al. |
| 10,171,586 B2 | 1/2019 | Shaashua et al. |
| 10,187,258 B2 | 1/2019 | Nagesh et al. |
| 10,354,531 B1 * | 7/2019 | Bronder .................. G06F 16/29 |
| 10,380,854 B1 | 8/2019 | Yu |
| 10,505,756 B2 | 12/2019 | Park et al. |
| 10,514,963 B2 | 12/2019 | Shrivastava et al. |
| 10,515,098 B2 | 12/2019 | Park et al. |
| 10,534,326 B2 | 1/2020 | Sridharan et al. |
| 10,536,295 B2 | 1/2020 | Fairweather et al. |
| 10,564,993 B2 | 2/2020 | Deutsch et al. |
| 10,705,492 B2 | 7/2020 | Harvey |
| 10,708,078 B2 | 7/2020 | Harvey |
| 10,760,815 B2 | 9/2020 | Janakiraman et al. |
| 10,762,475 B2 | 9/2020 | Song et al. |
| 10,824,120 B2 | 11/2020 | Ahmed |
| 10,845,771 B2 | 11/2020 | Harvey |
| 10,854,194 B2 | 12/2020 | Park et al. |
| 10,862,928 B1 | 12/2020 | Badawy et al. |
| 10,921,760 B2 | 2/2021 | Harvey |
| 10,921,972 B2 | 2/2021 | Park et al. |
| 10,969,133 B2 | 4/2021 | Harvey |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,041,650 B2 | 6/2021 | Li et al. |
| 11,054,796 B2 | 7/2021 | Holaso |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,127,235 B2 | 9/2021 | Sinha et al. |
| 11,229,138 B1 | 1/2022 | Harvey et al. |
| 11,314,726 B2 | 4/2022 | Park et al. |
| 11,314,788 B2 | 4/2022 | Park et al. |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0169514 A1 | 11/2002 | Eryurek et al. |
| 2002/0177909 A1 | 11/2002 | Fu et al. |
| 2002/0188557 A1 | 12/2002 | Ochiai |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0150908 A1 | 8/2003 | Pokorny et al. |
| 2003/0158704 A1 | 8/2003 | Triginai et al. |
| 2003/0158795 A1 | 8/2003 | Markham et al. |
| 2003/0171851 A1 | 9/2003 | Brickfield et al. |
| 2003/0200059 A1 | 10/2003 | Ignatowski et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2004/0252288 A1 | 12/2004 | Kacyra et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |
| 2006/0015376 A1 | 1/2006 | Sattler et al. |
| 2006/0095521 A1 | 5/2006 | Patinkin |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0227010 A1 * | 10/2006 | Berstis .................. G08G 1/14 340/932.2 |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0203693 A1 | 8/2007 | Estes |
| 2007/0250417 A1 | 10/2007 | Lane et al. |
| 2007/0250920 A1 | 10/2007 | Lindsay |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0162198 A1 | 7/2008 | Jabbour et al. |
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0263467 A1 | 10/2008 | Wilkins |
| 2008/0266383 A1 | 10/2008 | Shah et al. |
| 2008/0281472 A1 | 11/2008 | Podgorny et al. |
| 2009/0070407 A1 | 3/2009 | Castle et al. |
| 2009/0195349 A1 | 8/2009 | Frader-Thompson et al. |
| 2010/0045439 A1 | 2/2010 | Tak et al. |
| 2010/0058248 A1 | 3/2010 | Park |
| 2010/0128931 A1 | 5/2010 | Bongard |
| 2010/0131533 A1 | 5/2010 | Ortiz |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0054968 A1 | 3/2011 | Galaviz |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | MacKay et al. |
| 2011/0087988 A1 | 4/2011 | Ray et al. |
| 2011/0088000 A1 | 4/2011 | MacKay |
| 2011/0125737 A1 | 5/2011 | Pothering et al. |
| 2011/0137853 A1 | 6/2011 | MacKay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0184943 A1 | 7/2011 | Norton et al. |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2012/0011126 A1 | 1/2012 | Park et al. |
| 2012/0011141 A1 | 1/2012 | Park et al. |
| 2012/0022698 A1 | 1/2012 | Mackay |

(56) References Cited

U.S. PATENT DOCUMENTS

| | | |
|---|---|---|
| 2012/0062577 A1 | 3/2012 | Nixon |
| 2012/0064923 A1 | 3/2012 | Imes et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0112929 A1 | 5/2012 | Gupta et al. |
| 2012/0135759 A1 | 5/2012 | Imes et al. |
| 2012/0136485 A1 | 5/2012 | Weber et al. |
| 2012/0143356 A1 | 6/2012 | Berg-Sonne et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2012/0310852 A1 | 12/2012 | Ramalingamoorthy et al. |
| 2012/0323643 A1* | 12/2012 | Volz ............... G06Q 30/0631 705/13 |
| 2012/0326893 A1* | 12/2012 | Glezerman ............ G08G 1/148 340/932.2 |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0173062 A1 | 7/2013 | Koenig-Richardson |
| 2013/0204836 A1 | 8/2013 | Choi et al. |
| 2013/0226320 A1 | 8/2013 | Berg-Sonne et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2013/0338970 A1 | 12/2013 | Reghetti |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0135952 A1 | 5/2014 | Maehara |
| 2014/0139359 A1* | 5/2014 | Paul ................. G08G 1/148 705/13 |
| 2014/0152651 A1 | 6/2014 | Chen et al. |
| 2014/0172184 A1 | 6/2014 | Schmidt et al. |
| 2014/0189861 A1 | 7/2014 | Gupta et al. |
| 2014/0207282 A1 | 7/2014 | Angle et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2014/0334684 A1* | 11/2014 | Strimling ............... G08G 1/123 382/104 |
| 2014/0358285 A1 | 12/2014 | Aggarwal et al. |
| 2015/0019174 A1 | 1/2015 | Kiff et al. |
| 2015/0042240 A1 | 2/2015 | Aggarwal et al. |
| 2015/0066716 A1 | 3/2015 | Shortridge |
| 2015/0105917 A1 | 4/2015 | Sasaki et al. |
| 2015/0138001 A1* | 5/2015 | Davies ................. G08G 1/146 340/932.2 |
| 2015/0145468 A1 | 5/2015 | Ma et al. |
| 2015/0156030 A1 | 6/2015 | Fadell et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0220942 A1 | 8/2015 | Dubberley |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0310682 A1 | 10/2015 | Arora et al. |
| 2015/0316918 A1 | 11/2015 | Schleiss et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |
| 2015/0379080 A1 | 12/2015 | Jochimski |
| 2016/0011753 A1 | 1/2016 | McFarland et al. |
| 2016/0033946 A1 | 2/2016 | Zhu et al. |
| 2016/0035246 A1 | 2/2016 | Curtis |
| 2016/0049030 A1 | 2/2016 | G et al. |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0119434 A1 | 4/2016 | Dong et al. |
| 2016/0127712 A1 | 5/2016 | Alfredsson et al. |
| 2016/0134432 A1 | 5/2016 | Hund et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171785 A1 | 6/2016 | Banatwala et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0247129 A1 | 8/2016 | Song et al. |
| 2016/0260063 A1 | 9/2016 | Harris et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0350364 A1 | 12/2016 | Anicic et al. |
| 2016/0357521 A1 | 12/2016 | Zhang et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0092130 A1* | 3/2017 | Bostick ................. G08G 1/144 |
| 2017/0093700 A1 | 3/2017 | Gilley et al. |
| 2017/0098086 A1 | 4/2017 | Hoernecke et al. |
| 2017/0103327 A1 | 4/2017 | Penilla et al. |
| 2017/0103403 A1 | 4/2017 | Chu et al. |
| 2017/0123389 A1 | 5/2017 | Baez et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |

(56) References Cited

U.S. PATENT DOCUMENTS

| | | |
|---|---|---|
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323389 A1 | 11/2017 | Vavrasek |
| 2017/0329289 A1 | 11/2017 | Kohn et al. |
| 2017/0336770 A1 | 11/2017 | Macmillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2017/0372271 A1 | 12/2017 | Goldsmith et al. |
| 2018/0005495 A1 | 1/2018 | Hieb |
| 2018/0012159 A1 | 1/2018 | Kozloski et al. |
| 2018/0013579 A1 | 1/2018 | Fairweather et al. |
| 2018/0018508 A1 | 1/2018 | Tusch |
| 2018/0024520 A1 | 1/2018 | Sinha et al. |
| 2018/0039238 A1 | 2/2018 | Gärtner et al. |
| 2018/0048485 A1 | 2/2018 | Pelton et al. |
| 2018/0069932 A1 | 3/2018 | Tiwari et al. |
| 2018/0114140 A1 | 4/2018 | Chen et al. |
| 2018/0137288 A1 | 5/2018 | Polyakov |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0211539 A1* | 7/2018 | Boss ................. G08G 1/168 |
| 2018/0239982 A1 | 8/2018 | Rutschman et al. |
| 2018/0268238 A1* | 9/2018 | Khan ................. G06F 16/51 |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0308475 A1 | 10/2018 | Locke et al. |
| 2018/0336785 A1 | 11/2018 | Ghannam et al. |
| 2018/0356775 A1 | 12/2018 | Harvey |
| 2018/0359111 A1 | 12/2018 | Harvey |
| 2018/0364654 A1 | 12/2018 | Locke et al. |
| 2019/0005025 A1 | 1/2019 | Malabarba |
| 2019/0013023 A1 | 1/2019 | Pourmohammad et al. |
| 2019/0017719 A1 | 1/2019 | Sinha et al. |
| 2019/0025771 A1 | 1/2019 | Park et al. |
| 2019/0037135 A1 | 1/2019 | Hedge |
| 2019/0042988 A1 | 2/2019 | Brown et al. |
| 2019/0065014 A1 | 2/2019 | Richter et al. |
| 2019/0088059 A1 | 3/2019 | Santhosh et al. |
| 2019/0088106 A1 | 3/2019 | Grundstrom |
| 2019/0089808 A1 | 3/2019 | Santhosh et al. |
| 2019/0094824 A1 | 3/2019 | Xie et al. |
| 2019/0096147 A1 | 3/2019 | Park et al. |
| 2019/0096217 A1 | 3/2019 | Pourmohammad et al. |
| 2019/0102840 A1 | 4/2019 | Perl et al. |
| 2019/0108492 A1 | 4/2019 | Nelson et al. |
| 2019/0121801 A1 | 4/2019 | Jethwa et al. |
| 2019/0122050 A1* | 4/2019 | Beals ................. G06V 30/153 |
| 2019/0130365 A1 | 5/2019 | Pell et al. |
| 2019/0138333 A1 | 5/2019 | Deutsch et al. |
| 2019/0138512 A1 | 5/2019 | Pourmohammad et al. |
| 2019/0147883 A1 | 5/2019 | Mellenthin et al. |
| 2019/0156601 A1 | 5/2019 | Sinha et al. |
| 2019/0158309 A1 | 5/2019 | Park et al. |
| 2019/0163152 A1 | 5/2019 | Worrall et al. |
| 2019/0172165 A1 | 6/2019 | Verteletskyi et al. |
| 2019/0268178 A1 | 8/2019 | Fairweather et al. |
| 2019/0310979 A1 | 10/2019 | Masuzaki et al. |
| 2019/0342112 A1 | 11/2019 | Li et al. |
| 2019/0361852 A1 | 11/2019 | Rogynskyy et al. |
| 2019/0377306 A1 | 12/2019 | Harvey |
| 2020/0035101 A1* | 1/2020 | Brooks ................. G08G 1/143 |
| 2020/0116505 A1 | 4/2020 | Lei et al. |
| 2020/0210906 A1 | 7/2020 | Rice et al. |
| 2020/0226156 A1 | 7/2020 | Borra et al. |
| 2020/0234523 A1 | 7/2020 | Ma et al. |
| 2020/0285203 A1 | 9/2020 | Thakur et al. |
| 2020/0336328 A1 | 10/2020 | Harvey |
| 2020/0348632 A1 | 11/2020 | Harvey |
| 2020/0387576 A1 | 12/2020 | Brett et al. |
| 2020/0396208 A1 | 12/2020 | Brett et al. |
| 2021/0042299 A1 | 2/2021 | Migliori |
| 2021/0043221 A1 | 2/2021 | Yelchuru et al. |
| 2021/0325070 A1 | 10/2021 | Endel et al. |
| 2021/0342961 A1 | 11/2021 | Winter et al. |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0121965 A1 | 4/2022 | Chatterji et al. |
| 2022/0138684 A1 | 5/2022 | Harvey |
| 2022/0215264 A1 | 7/2022 | Harvey et al. |
| 2023/0010757 A1 | 1/2023 | Preciado |
| 2023/0071312 A1 | 3/2023 | Preciado et al. |
| 2023/0076011 A1 | 3/2023 | Preciado et al. |
| 2023/0083703 A1 | 3/2023 | Meiners |

FOREIGN PATENT DOCUMENTS

| | | |
|---|---|---|
| AU | 2019351573 A1 | 5/2021 |
| CN | 101415011 A | 4/2009 |
| CN | 102136099 A | 7/2011 |
| CN | 102136100 A | 7/2011 |
| CN | 102650876 A | 8/2012 |
| CN | 103942308 A | 7/2014 |
| CN | 104040583 A | 9/2014 |
| CN | 104603832 A | 5/2015 |
| CN | 104919484 A | 9/2015 |
| CN | 105841293 | 8/2016 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| EP | 2 528 033 A1 | 11/2012 |
| EP | 3 268 821 B1 | 1/2018 |
| EP | 3 324 306 A1 | 5/2018 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2008-310533 A | 12/2008 |
| JP | 2010-277532 A | 12/2010 |
| JP | 2013-152618 A | 8/2013 |
| JP | 2014-044457 A | 3/2014 |
| JP | 2015-060434 A | 3/2015 |
| KR | 2016066115 | 6/2016 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |

(56) References Cited

FOREIGN PATENT DOCUMENTS

| WO | WO-2017/035536 A1 | 3/2017 |
| --- | --- | --- |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |
| WO | WO-2018/132112 A1 | 7/2018 |
| WO | WO-201 8/232147 A1 | 12/2018 |
| WO | WO-2020/061621 A1 | 4/2020 |
| WO | WO-2022/042925 A1 | 3/2022 |

OTHER PUBLICATIONS

Hipla, "Visitor Management: Smart Solutions to visitors, saving time and maximizing productivity," URL: https://hipla.io/visitor-management.html, retrieved from internet Mar. 3, 2021, 3 pages.
Siemens, "The office as an active contributor to business success," URL: https://new.siemens.com/bg/en/products/buildings/markets/smart-office.html, retrieved from internet Mar. 4, 2021, 12 pages.
Splan, "Visitor Management: Manage visitor registrations and check-ins in an efficient and secured manner." URL: https://www.splan.com/visitor-management-system.html, 11 pages.
Marr, B., "What Is Digital Twin Technology—And Why Is It So Important?", Enterprise Tech, Mar. 6, 2017 (5 pages).
U.S. Appl. No. 17/566,029, Not Available, PassiveLogic, Inc.
U.S. Appl. No. 17/567,275, Not Available, PassiveLogic, Inc.
U.S. Appl. No. 17/722,115, Not Available, PassiveLogic, Inc.
Balaji et al., "Brick: Metadata schema for portable smart building applications," Applied Energy, 2018 (20 pages).
Balaji et al., "Brick: Metadata schema for portable smart building applications," Applied Energy, Sep. 15, 2018, 3 pages, (Abstract).
Balaji et al., "Demo Abstract: Portable Queries Using the Brick Schema for Building Applications," BuildSys '16, Palo Alto, CA, USA, Nov. 16-17, 2016 (2 pages).
Balaji, B. et al., "Brick: Towards a Unified Metadata Schema For Buildings." BuildSys '16, Palo Alto, CA, USA, Nov. 16-17, 2016 (10 pages).
Bhattacharya et al., "Short Paper: Analyzing Metadata Schemas for Buildings—The Good, The Bad and The Ugly," BuildSys '15, Seoul, South Korea, Nov. 4-5, 2015 (4 pages).
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).
Brick, "Brick: Towards a Unified Metadata Schema For Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).
Brick, "Metadata Schema for Buildings," URL: https://brickschema.org/docs/Brick-Leaflet.pdf, retrieved from internet Dec. 24, 2019 (3 pages).
Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023, Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C. et al., "Creating a room connectivity graph of a building from per-room sensor units." BuildSys '12, Toronto, ON, Canada, Nov. 6, 2012 (7 pages).
Extended European Search Report on EP Application No. 18196948.6 dated Apr. 10, 2019 (9 pages).
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jue 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Gao et al., "A large-scale evaluation of automated metadata inference approaches on sensors from air handling units," Advanced Engineering Informatics, 2018, 37 (pp. 14-30).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).

(56) References Cited

OTHER PUBLICATIONS

Hu, S et al., "Building performance optimisation: A hybrid architecture for the integration of contextual information and time-series data," Automation in Construction, 2016, 70 (pp. 51-61).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2017/052060, dated Oct. 5, 2017, 11 pages.
International Search Report and Written Opinion on PCT/US2017/052633, dated Oct. 23, 2017, 9 pages.
International Search Report and Written Opinion on PCT/US2017/052829, dated Nov. 27, 2017, 24 pages.
International Search Report and Written Opinion on PCT/US2018/024068, dated Jun. 15, 2018, 22 pages.
International Search Report and Written Opinion on PCT/US2018/052971, dated Mar. 1, 2019, 19 pages.
International Search Report and Written Opinion on PCT/US2018/052974, dated Dec. 19, 2018, 13 pages.
International Search Report and Written Opinion on PCT/US2018/052975, dated Jan. 2, 2019, 13 pages.
International Search Report and Written Opinion on PCT/US2018/052994, dated Jan. 7, 2019, 15 pages.
International Search Report and Written Opinion on PCT/US2019/015481, dated May 17, 2019, 78 pages.
International Search Report and Written Opinion on PCT/US2020/058381, dated Jan. 27, 2021, 30 pages.
Japanese Office Action on JP Appl. No. 2018-534963 dated May 11, 2021 (16 pages with English language translation).
Koh et al., "Plaster: An Integration, Benchmark, and Development Framework for Metadata Normalization Methods," BuildSys '18, Shenzhen, China, Nov. 7-8, 2018 (10 pages).
Koh et al., "Scrabble: Transferrable Semi-Automated Semantic Metadata Normalization using Intermediate Representation," BuildSys '18, Shenzhen, China, Nov. 7-8, 2018 (10 pages).
Koh et al., "Who can Access What, and When?" BuildSys '19, New York, NY, USA, Nov. 13-14, 2019 (4 pages).
Li et al., "Event Stream Processing with Out-of-Order Data Arrival," International Conferences on Distributed Computing Systems, 2007, (8 pages).
Nissin Electric Co., Ltd., "Smart power supply system (SPSS)," Outline of the scale verification plan, Nissin Electric Technical Report, Japan, Apr. 23, 2014, vol. 59, No. 1 (23 pages).
Passivelogic, "Explorer: Digital Twin Standard for Autonomous Systems. Made interactive." URL:https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Results of the Partial International Search for PCT/US2018/052971, dated Jan. 3, 2019, 3 pages.
Sinha, Sudhi and Al Huraimel, Khaled, "Reimagining Businesses with AI" John Wiley & Sons, Inc., Hoboken, NJ, USA, 2021 (156 pages).
Sinha, Sudhi R. and Park, Youngchoon, "Building an Effective IoT Ecosystem for Your Business," Johnson Controls International, Springer International Publishing, 2017 (286 pages).
Sinha, Sudhi, "Making Big Data Work For Your Business: A guide to effective Big Data analytics," Impackt Publishing LTD., Birmingham, UK, Oct. 2014 (170 pages).
The Virtual Nuclear Tourist, "Calvert Cliffs Nuclear Power Plant," URL:http://www.nucleartourist.com/us/calvert.htm, Jan. 11, 2006 (2 pages).
University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2022 (7 pages).
Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).
W3C, "SPARQL: Query Language for RDF," located on The Wayback Machine, URL:https://web.archive.org/web/20161230061728/http://www.w3.org/TR/rdf-sparql-query/), retrieved from internet Nov. 15, 2022 (89 pages).
Wei et al., "Development and Implementation of Software Gateways of Fire Fighting Subsystem Running on EBI," Control, Automation and Systems Engineering, IITA International Conference on, IEEE, Jul. 2009 (pp. 9-12).
White et al., "Reduce building maintenance costs with AWS IoT TwinMaker Knowledge Graph," The Internet of Things on AWS—Official Blog, URL: https://aws.amazon.com/blogs/iot/reduce-building-maintenance-costs-with-aws-iot-twinmaker-knowledge-graph/, Nov. 18, 2022 (10 pages).
Zhou, Q. et al., "Knowledge-infused and Consistent Complex Event Processing over Real-time and Persistent Streams," Further Generation Computer Systems, 2017, 76 (pp. 391-406).

\* cited by examiner

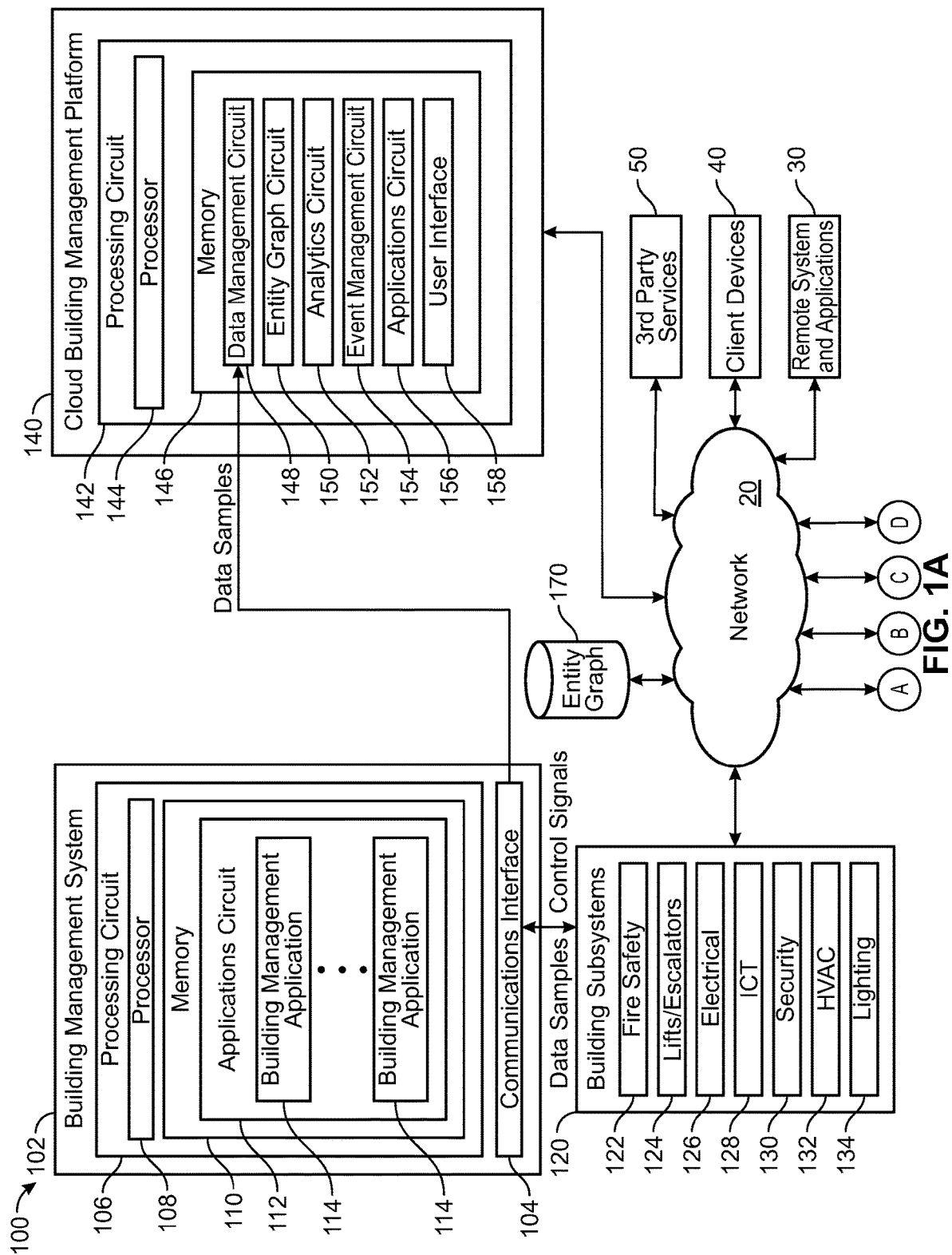

SMART PARKING LOT SYSTEM

CROSS-REFERENCE TO RELATED APPLICATION

The present Application is a continuation of U.S. patent application Ser. No. 16/746,453, filed on Jan. 17, 2020 and claims the benefit and priority to U.S. Provisional Patent Application No. 62/794,370, filed on Jan. 18, 2019, U.S. Provisional Patent Application No. 62/794,276, filed on Jan. 18, 2019, U.S. Provisional Patent Application No. 62/794,533, filed on Jan. 18, 2019, U.S. Provisional Patent Application No. 62/794,535, filed on Jan. 18, 2019, U.S. Provisional Patent Application No. 62/794,389, filed on Jan. 18, 2019, U.S. Provisional Patent Application No. 62/794,393, filed on Jan. 18, 2019, U.S. Provisional Patent Application No. 62/794,415, filed on Jan. 18, 2019, U.S. Provisional Patent Application No. 62/794,032, filed on Jan. 18, 2019, U.S. Provisional Patent Application No. 62/794,357, filed on Jan. 18, 2019, U.S. Provisional Patent Application No. 62/794,348, filed on Jan. 18, 2019, 62/794,407, filed on Jan. 18, 2019, U.S. Provisional Patent Application No. 62/794,502, filed on Jan. 18, 2019, U.S. Provisional Patent Application No. 62/794,489, filed on Jan. 18, 2019, the entire disclosures of each of which are incorporated by reference herein.

BACKGROUND

A building management system (BMS) is, in general, a system of devices configured to control, monitor, and manage equipment in and/or around a building or building area. A BMS can include, for example, an HVAC system, a security system, a lighting system, a fire alerting system, and any other system that is capable of managing building functions or devices, or any combination thereof.

SUMMARY

One implementation of the present disclosure is one or more non-transitory computer-readable storage media having instructions stored thereon that, when executed by one or more processors, cause the one or more processors to detect a vehicle that enters into a parking lot, identify an individual associated with the vehicle, retrieve context information corresponding to the individual, dynamically determine a first parking space based on the context information and available parking spaces, and provide the individual with directions to the first parking space.

In some embodiments, the context information includes a schedule having events associated with the individual. In some embodiments, dynamically determining the first parking space further includes determining the first parking space based on a time associated with a next event on the schedule of events. In some embodiments, dynamically determining the first parking space further includes determining the first parking space based on a physical location of the next event on the schedule of events. In some embodiments, the context information includes an organizational role of the individual, and wherein dynamically determining the first parking space further includes determining the first parking space based on the organizational role of the individual. In some embodiments, the context information includes a physical characteristic of the individual. In some embodiments, detecting the vehicle includes recognizing a license plate of the vehicle. In some embodiments, providing the individual with directions to the first parking space further includes transmitting the directions to a device associated with the individual. In some embodiments, dynamically determining the first parking space further includes determining the first parking space based on a number of schedules associated with a number of individuals, wherein each of the number of schedules indicates that the associated individual is visiting a space associated with the parking lot.

Another implementation of the present disclosure is a method of smart parking space assignment, including detecting a vehicle that enters into a parking lot, identifying an individual associated with the vehicle, retrieving context information corresponding to the individual, dynamically determining a first parking space based on the context information and available parking spaces, and providing the individual with directions to the first parking space.

In some embodiments, the context information includes a schedule having events associated with the individual. In some embodiments, dynamically determining the first parking space further includes determining the first parking space based on a time associated with a next event on the schedule of events. In some embodiments, dynamically determining the first parking space further includes determining the first parking space based on a physical location of the next event on the schedule of events. In some embodiments, the context information includes an organizational role of the individual, and wherein dynamically determining the first parking space further includes determining the first parking space based on the organizational role of the individual. In some embodiments, the context information includes a physical characteristic of the individual. In some embodiments, detecting the vehicle includes recognizing a license plate of the vehicle. In some embodiments, providing the individual with directions to the first parking space further includes transmitting the directions to a device associated with the individual. In some embodiments, dynamically determining the first parking space further includes determining the first parking space based on a number of schedules associated with a number of individuals, wherein each of the number of schedules indicates that the associated individual is visiting a space associated with the parking lot.

Another implementation of the present disclosure is a building management system (BMS), including, one or more processing circuits and one or more computer readable storage media, the one or more computer readable storage media having instructions stored thereon that, when executed by the one or more processing circuits, cause the one or more processing circuits to detect a vehicle that enters into a parking lot, identify an individual associated with the vehicle, retrieve context information corresponding to the individual, dynamically determine a first parking space based on the context information and available parking spaces, and provide the individual with directions to the first parking space.

In some embodiments, the context information includes a schedule having events associated with the individual, and wherein dynamically determining the first parking space further includes determining the first parking space based on a time and a physical location of a next event on the schedule of events.

Another implementation of the present disclosure is one or more non-transitory computer-readable storage media having instructions stored thereon that, when executed by one or more processors, cause the one or more processors to detect a vehicle that enters into a parking lot, identify an individual associated with the vehicle, retrieve context information corresponding to the individual, identify an interested person based on the context information, and provide the interested person with an indication that the individual has arrived in the parking lot.

In some embodiments, the context information includes a schedule having events associated with the individual. In some embodiments, the interested person includes an attendee of an event on the schedule of events. In some embodiments, the interested person includes security personnel. In some embodiments, the processing circuit provides the interested person with an indication that the individual has arrived in the parking lot in response to determining that the vehicle is parked in an assigned parking space. In some embodiments, the processing circuit determines that the vehicle is parked in the assigned parking space based on sensors located at the assigned parking space detecting a presence of the vehicle. In some embodiments, the indication includes a location of the individual.

Another implementation of the present disclosure is a method of smart parking notifications, including detecting a vehicle that enters into a parking lot, identifying an individual associated with the vehicle, retrieving context information corresponding to the individual, identifying an interested person based on the context information, and providing the interested person with an indication that the individual has arrived in the parking lot.

In some embodiments, the context information includes a schedule having events associated with the individual. In some embodiments, the interested person includes an attendee of an event on the schedule of events. In some embodiments, interested person includes security personnel. In some embodiments, the processing circuit provides the interested person with an indication that the individual has arrived in the parking lot in response to determining that the vehicle is parked in an assigned parking space. In some embodiments, the processing circuit determines that the vehicle is parked in the assigned parking space based on sensors located at the assigned parking space detecting a presence of the vehicle. In some embodiments, the indication includes a location of the individual.

Another implementation of the present disclosure is a building management system (BMS), includes one or more processing circuits and one or more computer readable storage media, the one or more computer readable storage media having instructions stored thereon that, when executed by the one or more processing circuits, cause the one or more processing circuits to detect a vehicle that enters into a parking lot, identify an individual associated with the vehicle, retrieve context information corresponding to the individual, identify an interested person based on the context information, and provide the interested person with an indication that the individual has arrived in the parking lot.

In some embodiments, the context information includes a schedule having events associated with the individual. In some embodiments, the interested person includes an attendee of an event on the schedule of events. In some embodiments, the interested person includes security personnel. In some embodiments, the processing circuit provides the interested person with an indication that the individual has arrived in the parking lot in response to determining that the vehicle is parked in an assigned parking space. In some embodiments, the processing circuit determines that the vehicle is parked in the assigned parking space based on sensors located at the assigned parking space detecting a presence of the vehicle.

Another implementation of the present disclosure is one or more non-transitory computer-readable storage media having instructions stored thereon that, when executed by one or more processors, cause the one or more processors to detect vehicles that enter into a parking lot, identify a characteristic of one or both of the vehicles or users of the vehicles, generate a model of usage of the parking lot based on the one or both of the identified characteristic of the vehicles or the users of the vehicles, compare the model of the usage of the parking lot to a model of the parking lot, and dynamically generate suggested changes in a service level associated with the parking lot based on the comparison of the model of the usage of the parking lot and the model of the parking lot.

In some embodiments, identifying the characteristic of the vehicles further includes identifying an occupancy of the vehicles. In some embodiments, the model of the usage of the parking lot includes user characteristics associated with the parking lot. In some embodiments, the user characteristics include a number of individuals using the parking lot based on the identified occupancy of the vehicles. In some embodiments, the model of the usage of the parking lot includes historical information describing a user population associated with the parking lot over a period of time. In some embodiments, dynamically generating suggested changes in the service level of the parking lot further includes generating suggested changes to the parking lot based on the historical information. In some embodiments, the suggested changes include non-person related attributes associated with use of the parking lot. In some embodiments, the suggested changes include physical alterations of the parking lot. In some embodiments, the model of the usage of the parking lot includes vehicle characteristics associated with the parking lot. In some embodiments, in response to identifying the characteristic of one or both of the vehicles or the users of the vehicles, the one or more processors update a database using the one or both of the identified characteristic of the vehicles or the users of the vehicles.

Another implementation of the present disclosure is a method, including detecting vehicles that enter into a parking lot, identifying a characteristic of one or both of the vehicles or users of the vehicles, generating a model of usage of the parking lot based on the one or both of the identified characteristic of the vehicles or the users of the vehicles, comparing the model of the usage of the parking lot to a model of the parking lot, and dynamically generating suggested changes to a service level associated with the parking lot based on the comparison of the model of the usage of the parking lot and the model of the parking lot.

In some embodiments, identifying the characteristic of the vehicles further includes identifying an occupancy of the vehicles. In some embodiments, the model of the usage of the parking lot includes user characteristics associated with the parking lot. In some embodiments, the model of the usage of the parking lot includes historical information describing a user population associated with the parking lot over a period of time. In some embodiments, dynamically generating suggested changes to the service level associated with the parking lot further includes generating suggested changes to the parking lot based on the historical information. In some embodiments, the suggested changes include non-person related attributes associated with use of the parking lot. In some embodiments, the suggested changes include physical alterations of the parking lot. In some embodiments, the model of the usage of the parking lot includes vehicle characteristics associated with the parking lot.

Another implementation of the present disclosure is a building management system (BMS), including one or more processing circuits and one or more computer readable storage media, the one or more computer readable storage media having instructions stored thereon that, when executed by the one or more processing circuits, cause the one or more processing circuits to detect vehicles that enter into a parking lot, identify a characteristic of one or both of the vehicles or users of the vehicles, generate a model of a usage of the parking lot based on the one or both of the identified characteristics of the vehicles or the users of the vehicles, compare the model of the usage of the parking lot to a model of the parking lot, and dynamically generate suggested changes to a service level associated with the parking lot based on the comparison of the model of the usage of the parking lot and the model of the parking lot.

In some embodiments, the model of the usage of the parking lot includes historical information describing a user population associated with the parking lot over a period of time.

Another implementation of the present disclosure is one or more non-transitory computer-readable storage media having instructions stored thereon that, when executed by one or more processors, cause the one or more processors to receive, from sensors, data describing energy use associated with a building, receive, from sensors, data describing energy use associated with a parking lot associated with the building, generate a model of energy transfer between the building and the parking lot based on the received data describing energy use associated with the building and the parking lot, and generate an indication based on the model of energy transfer between the building and the parking lot.

In some embodiments, the indication is an amount of energy to be used by the building. In some embodiments, the indication is transmitted to a controller to control an amount of energy used by the parking lot. In some embodiments, the indication is a message describing electric vehicle charging capabilities in the parking lot, and wherein the indication is transmitted to one or more user devices associated with individuals that use the parking lot. In some embodiments, the indication further includes a price associated with the electric vehicle charging capabilities. In some embodiments, generating the indication further includes determining a distribution of energy use between the building and the parking lot based on training a machine learning algorithm using the model. In some embodiments, the distribution of energy use between the building and the parking lot changes over time.

Another implementation of the present disclosure is a method, including receiving, from sensors, data describing energy use associated with a building, receiving, from sensors, data describing energy use associated with a parking lot associated with the building, generating a model of energy transfer between the building and the parking lot based on the received data describing energy use associated with the building and the parking lot, and generating an indication based on the model of energy transfer between the building and the parking lot.

In some embodiments, the indication is an amount of energy to be used by the building. In some embodiments, the indication is transmitted to a controller to control an amount of energy used by the parking lot. In some embodiments, the indication is a message describing electric vehicle charging capabilities in the parking lot, and wherein the indication is transmitted to one or more user devices associated with individuals that use the parking lot. In some embodiments, the indication further includes a price associated with the electric vehicle charging capabilities. In some embodiments, generating the indication further includes determining a distribution of energy use between the building and the parking lot based on training a machine learning algorithm using the model. In some embodiments, the distribution of energy use between the building and the parking lot changes over time.

Another implementation of the present disclosure is a building management system (BMS), including one or more processing circuits and one or more computer readable storage media, the one or more computer readable storage media having instructions stored thereon that, when executed by the one or more processing circuits, cause the one or more processing circuits to receive, from sensors, data describing energy use associated with a building, receive, from sensors, data describing energy use associated with a parking lot associated with the building, generate a model of energy transfer between the building and the parking lot based on the received data describing energy use associated with the building and the parking lot, and generate an indication based on the model of energy transfer between the building and the parking lot.

In some embodiments, the indication is an amount of energy to be used by the building. In some embodiments, the indication is transmitted to a controller to control an amount of energy used by the parking lot. In some embodiments, the indication is a message describing electric vehicle charging capabilities in the parking lot, and wherein the indication is transmitted to one or more user devices associated with individuals that use the parking lot. In some embodiments, the indication further includes a price associated with the electric vehicle charging capabilities. In some embodiments, generating the indication further includes determining a distribution of energy use between the building and the parking lot based on training a machine learning algorithm using the model, and wherein the distribution of energy use between the building and the parking lot changes over time.

Another implementation of the present disclosure is a system for providing information in a parking environment including one or more processing circuits, each processing circuit including one or more processors and memories having instructions stored thereon that, when executed by the one or more processors, cause the one or more processors to detect a vehicle that enters into a parking lot, identify an individual associated with the vehicle, retrieve context information corresponding to the individual responsive to identifying the individual, dynamically determine a first parking space based on the context information and available parking spaces, and provide the individual with directions to the first parking space.

In some embodiments, the context information includes a schedule having events associated with the individual. In some embodiments, dynamically determining the first parking space further includes determining the first parking space based on a time associated with a next event on the schedule of events. In some embodiments, dynamically determining the first parking space further includes determining the first parking space based on a physical location of the next event on the schedule of events. In some embodiments, the context information includes an organizational role of the individual, and wherein dynamically determining the first parking space further includes determining the first parking space based on the organizational role of the individual. In some embodiments, the context information includes a physical characteristic of the individual. In some embodiments, detecting the vehicle includes recognizing a license plate of the vehicle. In some embodiments, providing the individual with directions to the first parking space further includes transmitting the directions to a device associated with the individual. In some embodiments, dynamically determining the first parking space further includes determining the first parking space based on a plurality of schedules associated with a plurality of individuals, wherein each of the plurality of schedules indicates that the associated individual is visiting a space associated with the parking lot.

Another implementation of the present disclosure is a method for providing information in a parking environment including detecting, using image data from an imaging device, a vehicle that enters into a parking lot by identifying a license plate of the vehicle, identifying an individual associated with the vehicle based on the license plate, retrieving context information corresponding to the individual responsive to identifying the individual, dynamically determining a first parking space based on the context information and available parking spaces, and providing the individual with directions to the first parking space.

In some embodiments, the context information includes an organizational role of the individual, and wherein dynamically determining the first parking space further includes determining the first parking space based on the organizational role of the individual.

BRIEF DESCRIPTION OF THE DRAWINGS

The above and other aspects and features of the present disclosure will become more apparent to those skilled in the art from the following detailed description of the example embodiments with reference to the accompanying drawings.

FIG. 1A is a block diagram of a smart building environment, according to an exemplary embodiment.

DETAILED DESCRIPTION

Referring generally to the FIGURES, described herein are systems and methods of a smart parking system. A smart parking system may include a smart parking lot and/or a smart parking lot management system. The smart parking lot may include sensors configured to generate data for identifying vehicles and/or individuals. The smart parking lot may be communicably coupled to the smart parking lot management system. The smart parking lot management system may identify, based on the data from the sensors, an individual, retrieve context information corresponding to the identified individual, and take actions based on the retrieved context information. For example, the smart parking lot management system may determine when an individual has arrived at the smart parking lot and may notify an interested person of their arrival. As a further example, the smart parking lot management system may dynamically assign an individual a parking space based on a schedule of the individual and physical characteristics of the individual. For example, the smart parking lot management system may determine that an individual is late for a meeting and has difficulty walking and may assign the individual a parking space that is nearby the meeting and an elevator to take the individual to a floor of the meeting room.

Figure 1B:
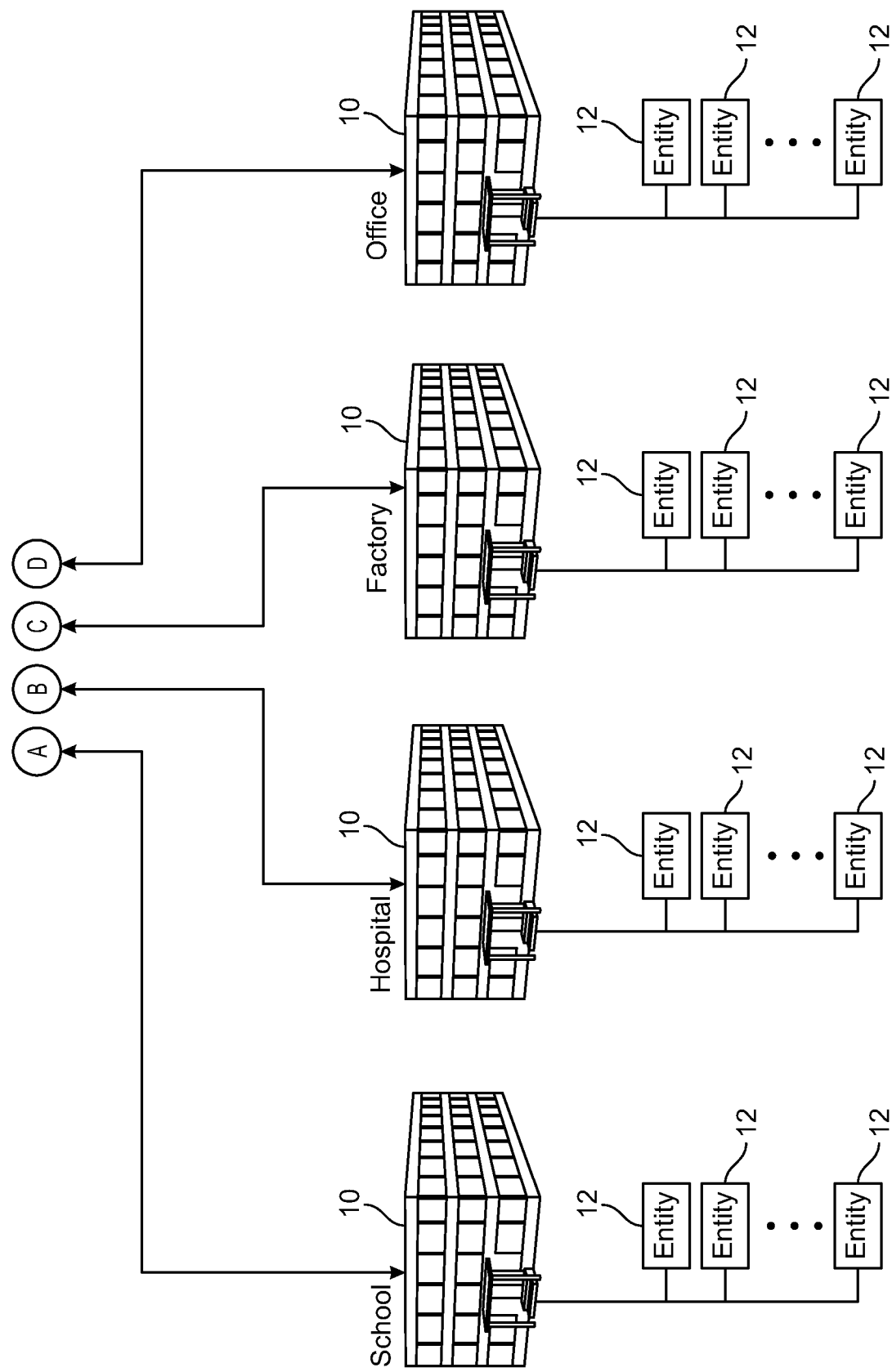
FIG. 1B is another block diagram of the smart building environment of FIG. 1A, according to an exemplary embodiment.

Hereinafter, example embodiments will be described in more detail with reference to the accompanying drawings. Referring now to FIGS. 1A-1B, a block diagram of a smart building environment 100 is shown, according to an exemplary embodiment. Smart building environment 100 is shown to include cloud building management platform 140. Cloud building management platform 140 may be configured to collect information from a variety of different data sources. Cloud management platform 140 may create digital representations, referred to as "digital twins," of physical spaces, equipment, people, and/or events based on the collected information. In various embodiments, the digital representations are stored in an entity graph. In brief overview, an entity graph is a data structure representing entities (e.g., spaces, equipment, people, events, etc.) and relationships between the entities. In various embodiments, the entity graph data structure facilitates advanced artificial intelligence and machine learning associated with the entities. In various embodiments, entities within the entity graph data structure include or are associated with "agents," or software entities configured to take actions with respect to the digital twins/real world entities with which they are associated. In some implementations, the agents may be configured to implement artificial intelligence/machine learning methodologies. The agents may be configured to facilitate communication and collection of information between the variety of different data sources. Each of the data sources may be implemented as, include, or otherwise use respective agents for facilitating communication amongst or between the data sources and cloud building management platform 140. The agents of cloud building management platform 140 and data sources may be configured to communicate using defined channels across which the agents may exchange information, messages, data, etc. amongst each other. In some examples, channels may be defined for particular spaces, subspaces, control loops, groups of equipment, people, buildings or groups of buildings, etc. In some implementations, agents may communicate by publishing messages to particular channels and subscribing to messages on particular channels and/or published by particular other agents/types of agents. In various embodiments, the data sources include buildings. For example, cloud building management platform 140 may interact with a number of buildings, each of which may include an agent (or a group of agents corresponding to various building subsystems within the respective building), to receive information. Hence, cloud building management platform 140 and the data sources may together form a network of agents to facilitate artificially intelligent exchange and communication of information across various channels. In some embodiments, one or more device(s), component(s), space(s) (and sets of devices, components, spaces) within cloud building management platform 140 may include a respective agent dedicated to perform various tasks associated therewith. The agents may therefore be dedicated for performing separate functions or tasks.

In various embodiments, cloud building management platform 140 collects data from buildings 10. For example, cloud building management platform 140 may collect data from buildings 10 such as a school, a hospital, a factory, an office building, and/or the like. It should be understood that the present disclosure is not limited to the number or types of buildings 10 shown in FIG. 1B. As new devices/components/spaces/buildings/events/control loops are added or otherwise incorporated into smart building environment 100, new digital representations (and associated agents, etc.) may be dynamically generated and incorporated into the entity graph data structure. Various examples of agents and corresponding networking may be found in U.S. patent application Ser. No. 15/934,593, filed Mar. 23, 2018, and titled "Building Management System with Dynamic Channel Communication", P.C.T. Application No. PCT/US2018/037,589, filed Jun. 14, 2018, and titled "Building Management System with Artificial Intelligence for Unified Agent Based Control of Building Subsystems," and U.S. patent application Ser. No. 16/036,685, filed Jul. 16, 2018, and titled "Systems and Methods for Agent Based Building Simulation for Optimal Control", the contents of each of which are incorporated herein by reference.

Buildings 10 may include entities 12. Entities 12 may include spaces, equipment, people, and/or events. In some embodiments, entities 12 include spaces such as floors, rooms, zones, campuses, buildings, and the like. In some embodiments, entities 12 include people such as employees, visitors, pedestrians, staff, and the like. In some embodiments, entities 12 include equipment such as inventory, assets, furniture, vehicles, building components, devices, and the like. For example, entities 12 may include devices such as internet of things (IoT) devices. IoT devices may include any of a variety of physical devices, sensors, actuators, electronics, vehicles, home appliances, and/or other items capable of communicating data over an electronic network (e.g., smart lights, smart appliances, smart home hub devices, etc.). In some embodiments, entities 12 include events such as meetings, fault indications, alarms, and the like. In various embodiments, cloud building management platform 140 receives information associated with buildings 10 and/or entities 12 and generates entity graph 170 based on the received information. Entity graph 170 may include digital twins that are digital representations of real world spaces, equipment, people, events, and/or the like. Entity graph 170 is described in greater detail below with reference to FIG. 3A-3B.

Smart building environment 100 may include building management system (BMS) 102. In various embodiments, BMS 102 communicates with cloud building management platform 140 to facilitate management and control of buildings 10 and/or the various operations described herein. BMS 102 may be configured to control, monitor, and/or manage equipment in or around a building or building area (e.g., such as buildings 10, etc.). For example, BMS 102 may include a HVAC system, a security system, a lighting system, a fire alerting system, and any other system that is capable of managing building functions or devices, or any combination thereof. Further, each of the systems may include sensors and other devices (e.g., IoT devices) for the proper operation, maintenance, monitoring, and the like of the respective systems. In some embodiments, each of buildings 10 is associated with a BMS 102. Additionally or alternatively, a single BMS 102 may manage multiple buildings 10. For example, a first BMS 102 may manage a first building 10, a second BMS 102 may manage a second building 10, and a third BMS 102 may manage the first and second buildings 10 (e.g., via the first and second BMS 102, in a master-slave configuration, etc.), as well as a third building 10. In various embodiments, BMS 102 communicates with building subsystems 120.

Building subsystems 120 may include fire safety subsystem 122, lift/escalators subsystem 124, building electrical subsystem 126, information communication technology (ICT) subsystem 128, security subsystem 130, HVAC subsystem 132, and/or lighting subsystem 134. In various embodiments, building subsystems 120 include fewer, additional, or alternative subsystems. For example, building subsystems 120 may additionally or alternatively include a refrigeration subsystem, an advertising or signage subsystem, a cooking subsystem, a vending subsystem, a printer or copy service subsystem, or any other type of building subsystem that uses controllable equipment and/or sensors to monitor or control a building 10. In some embodiment each of buildings 10 includes building subsystems 120. Additionally or alternatively, multiple buildings 10 may share at least some of building subsystems 120.

Each of building subsystems 120 may include any number of devices (e.g., IoT devices), sensors, controllers, and connections to facilitate functions and control activities. For example, HVAC subsystem 132 may include a chiller, a boiler, any number of air handling units, economizers, field controllers, supervisory controllers, actuators, temperature sensors, and other devices for controlling the temperature, humidity, airflow, or other variable conditions within buildings 10. Lighting subsystem 134 may include any number of light fixtures, ballasts, lighting sensors, dimmers, or other devices configured to controllably adjust the amount of light provided to a building space. Security subsystem 130 may include occupancy sensors, video surveillance cameras, digital video recorders, video processing servers, intrusion detection devices, access control devices and servers, or other security-related devices.

Cloud building management platform 140 and/or BMS 102 may interact with a variety of external systems. For example, cloud building management platform 140 may interact with remote systems and applications 30, client devices 40, and/or third party services 50. In various embodiments, systems and/or components of smart building environment 100 are configured to communicate using network 20. Network 20 may include hardware, software, or any combination thereof.

BMS 102 is shown to include communications interface 104 and processing circuit 106. Communications interface 104 may facilitate communications between BMS 102 and external systems/applications (e.g., cloud building management platform 140, remote systems and applications 30, client devices 40, third party services 50, building subsystems 120, etc.). Communications interface 104 may be or include wired or wireless communications interfaces (e.g., jacks, antennas, transmitters, receivers, transceivers, wire terminals, etc.) for conducting data communications within smart building environment 100 and/or with other external systems or devices. In various embodiments, communications via communications interface 104 is direct (e.g., local wired or wireless communications). Additionally or alternatively, communications via communications interface 104 may be via network 20 (e.g., a WAN, the Internet, a cellular network, etc.). For example, cloud building management platform 140 may communicate with BMS 102 using a wired connection and may communicate with client devices 40 (e.g., via BMS 102, etc.) using a cellular connection (e.g., a 4G or 5G access point/small cell base station, etc.). As a further example, communications interface 104 may include an Ethernet card and port for sending and receiving data via an Ethernet-based communications link or network. As a further example, communications interface 104 may include a Wi-Fi transceiver for communicating via a wireless communications network. As yet a further example, communications interface 104 may include cellular or mobile phone communications transceivers.

Processing circuit 106 may include processor 108 and memory 110. Processing circuit 106 may be communicably connected to communications interface 104 such that processing circuit 106 and the various components thereof can send and receive data via communications interface 104. Processor 108 may be implemented as a general purpose processor, an application specific integrated circuit (ASIC), one or more field programmable gate arrays (FPGAs), a group of processing components, or other suitable electronic processing components.

Memory 110 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 110 may be or include volatile memory or non-volatile memory. Memory 110 may include database components, object code components, script components, or any other type of information structure for supporting the various activities and information structures described in the present application. According to some embodiments, memory 110 is communicably connected to processor 108 via processing circuit 106 and includes computer code for executing (e.g., by processing circuit 106 and/or processor 108) one or more of the operations described herein.

In some embodiments, BMS 102 and/or cloud building management platform 140 are implemented within a single computer (e.g., one server, one housing, etc.). In various other embodiments BMS 102 and/or cloud building management platform 140 are distributed across multiple servers or computers (e.g., that can exist in distributed locations). In some embodiments, functions of BMS 102 and/or cloud building management platform 140 are implemented as agents. For example, BMS 102 may include a fault detection agent configured to analyze building data and detect faults associated with building components.

Memory 110 may include applications circuit 112 that may include building management application(s) 114. Building management application(s) 114 may include various systems to monitor and/or control specific processes/events within buildings 10. For example, building management application(s) 114 may include automated measurement and validation (AM&V), demand response (DR), fault detection and diagnostics (FDD), integrated control systems, and/or a building subsystem integration system. Building management application(s) 114 may be configured to receive inputs from building subsystems 120 and/or other data sources, determine improved and/or optimal control actions for building subsystems 120 based on the inputs, generate control signals based on the improved and/or optimal control actions, and provide the generated control signals to building subsystems 120.

Cloud building management platform 140 is shown to include processing circuit 142 having processor 144 and memory 146. In some embodiments, cloud building management platform 140 includes multiple processing circuits 142 each having one or more processors 144 and/or memories 146. Processor 144 may be a general purpose or specific purpose processor, an application specific integrated circuit (ASIC), one or more field programmable gate arrays (FPGAs), a group of processing components, or other suitable processing components. Processor 144 may be configured to execute computer code or instructions stored in memory 146 or received from other computer readable media (e.g., CDROM, network storage, a remote server, etc.).

Memory 146 may include one or more devices (e.g., memory units, memory devices, storage devices, etc.) for storing data and/or computer code for completing and/or facilitating the various processes described in the present disclosure. Memory 146 may include random access memory (RAM), read-only memory (ROM), hard drive storage, temporary storage, non-volatile memory, flash memory, optical memory, or any other suitable memory for storing software objects and/or computer instructions. Memory 146 may include database components, object code components, script components, or any other type of information structure for supporting the various activities and information structures described in the present disclosure. According to some embodiments, memory 146 is communicably connected to processor 144 via processing circuit 142 and includes computer code for executing (e.g., by processing circuit 142 and/or processor 144) one or more of the operations described herein.

Memory 146 may include data management circuit 148, entity graph circuit 150, analytics circuit 152, event management circuit 154, applications circuit 156, and/or user interface circuit 158. Data management circuit 148 may be configured to collect, manage, and/or retrieve data. In various embodiments, data management circuit 148 receives data samples from buildings 10 (e.g., via BMS 102, directly, etc.) and stores the data samples in structured storage. For example, the data samples may include data values for various data points. The data values may be measured and/or calculated values, depending on the type of data point. For example, a data point received from a temperature sensor may include a measured data value indicating a temperature measured by the temperature sensor. Data management circuit 148 may receive data samples from systems, components, and/or devices (e.g., IoT devices, sensors, etc.) within smart building environment 100 (e.g., remote systems and applications 30, client devices 40, third party services 50, BMS 102, building subsystems 120, etc.) and/or from external systems (e.g., the Internet, etc.). For example, data management circuit 148 may receive timeseries data from an occupancy sensor associated with one of buildings 10 and facilitate storage of the timeseries data in structured storage (e.g., in entity graph 170, etc.). As a further example, data management circuit 148 may receive an electronic calendar event (e.g., a meeting invitation, etc.) from one of client devices 40 and facilitate storage of the electronic calendar event in structure storage (e.g., in entity graph 170, etc.). In some embodiments, data management circuit 148 uses or retrieves an entity graph (e.g., via entity graph circuit 150, etc.) when organizing received data.

Entity graph circuit 150 may be configured to manage entity graph 170. In various embodiments, entity graph circuit 150 registers and manages various buildings (e.g., building 10, etc.), spaces, persons, subsystems (e.g., building subsystems 120, etc.), devices (e.g., IoT devices, etc.), events, and/or other entities in cloud building management platform 140. As described above, an entity may be any person, place, space, physical object, equipment, or the like. Further, an entity may be any event, data point, record structure, or the like. Entities and entity graph 170 are described in detail below with reference to FIGS. 3A-3B.

Analytics circuit 152 may be configured to analyze data to generate results. For example, analytics circuit 152 may analyze sensor data (e.g., weight measurements, image data, audio data, etc.) from a building lobby to identify a user. As a further example, analytics circuit 152 may apply fault detection rules to timeseries data from an HVAC system to detect a fault associated with the HVAC system. In various embodiments, analytics circuit 152 performs operations on information stored in entity graph 170. For example, analytics circuit 152 may traverse entity graph 170 to retrieve context information (e.g., energy usage, event activity, occupancy sensor data, HVAC control schedules, etc.) associated with one of buildings 10, and analyze the context information to determine a user schedule associated with the building (e.g., when the building is most heavily in use, etc.).

Event management circuit 154 may be configured to generate actions. For example, event management circuit 154 may receive event data from building subsystems 120 (e.g., a security alarm, etc.), and generate a response based on the event data (e.g., cause BMS 102 to sound an alarm, etc.). In various embodiments, event management circuit 154 generates actions dynamically. For example, event management circuit 154 may include artificially intelligent agents configured to generate actions in real-time based on received input. For example, event management circuit 154 may include an AI agent that dynamically generates a notification to an interested party in response to receiving an indication of an identified individual. As a further example, event management circuit 154 may receive a prediction from analytics circuit 152 that a building component is about to enter a fault state and may dynamically generate a work order ticket for the building component in response to the received prediction.

Applications circuit 156 may be configured to facilitate a variety of applications associated with cloud building management platform 140. For example, applications circuit 156 may facilitate a smart messaging system, a personal comfort system, a health and wellness system, a smart parking lot system, a smart signage system, a smart lobby system, a smart meeting room system, an employee productivity system, and/or the like. In various embodiments, applications circuit 156 facilitates operation of various systems that integrate with smart building environment 100. For example, applications circuit 156 may facilitate a FDD system that receives data from buildings 10 and generates fault indications associated with buildings 10.

User interface 158 may be configured to facilitate user interaction with cloud building management platform 140 and/or BMS 102. For example, a user may update personalized preferences associated with operation of cloud building management platform 140 via user interface 158. In some embodiments, user interface 158 facilitates dynamic feedback (e.g., a natural user interface, etc). For example, user interface 158 may facilitate chatbot interaction, voice commands, user authentication, biometric feedback, or the like.

Figure 2:
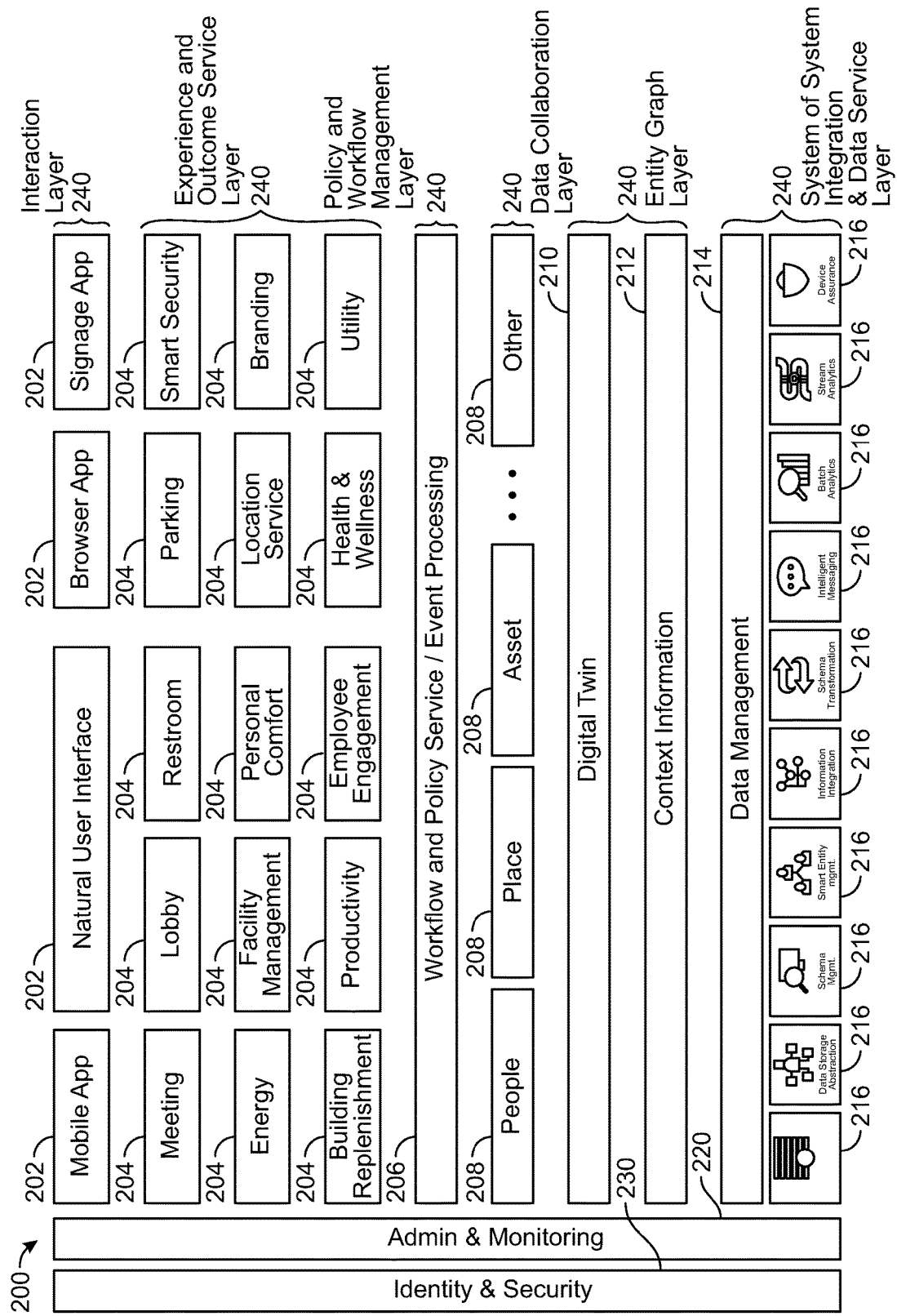
FIG. 2 is a block diagram of a building data platform associated with the smart building environment of FIGS. 1A-1B, according to an exemplary embodiment.

Referring now to FIG. 2, a building data platform 200 associated with the smart building environment 100 is shown, according to an exemplary embodiment. In various embodiments, cloud building management platform 140 implements the architecture of building data platform 200. Building data platform 200 is shown to include various layers 240. For example, layers 240 may include an interaction layer, an experience and outcome service layer, a policy and workflow management layer, data collaboration layer, entity graph layer, and/or a system of system integration and data service layer. In various embodiments, building data platform 200 includes interface(s) 202. For example, interface(s) 202 may include a mobile phone application, a natural user interface (e.g., voice recognition, chatbot services, text recognition, etc.), a browser application, a signage system, and/or the like. Interface(s) 202 may facilitate human-to-machine interaction, information visualization, and user experience functions.

In various embodiments, building data platform 200 includes service(s) 204. Service(s) 204 may include various user deliverables (e.g., outcomes, experiences, etc.) facilitated by building data platform 200. For example, service(s) 204 may include meeting scheduling, energy management, building supplies replenishment, lobby management (e.g., tracking a number of individuals in a building lobby and responding based on the number of individuals, etc.), facility management, productivity features (e.g., measuring and reporting on employee productivity, generating productivity suggestions, etc.), restroom management (e.g., monitoring a cleanliness of building restrooms, etc.), personal comfort management (e.g., adjusting building parameters based on occupant comfort preferences, etc.), employee engagement features (e.g., monitoring and reporting on employee engagement, generating engagement suggestions, etc.), parking management (e.g., dynamically assigning parking spaces, etc.), location services (e.g., generating actions based on users' locations, etc.), health and wellness features (e.g., monitoring and reporting on employee health and wellness, generating health and wellness suggestions, etc.), smart security (e.g., dynamically identifying individuals within a building, monitoring security parameters associated with a building, etc.), branding features (e.g., dynamic digital signage updating based on an identity of a viewer, etc.), and/or utility features (e.g., monitoring and reporting on building utility usage, generating suggestions to reduce utility consumption and/or cost, etc.). In various embodiments, service(s) 204 generate a virtual view of data from data collaboration, business workflows, and downstream sub-systems (e.g., sensors, actuators, etc.).

In various embodiments, building data platform 200 includes event processing 206. Event processing 206 may facilitate generating actions based on received data. For example, event processing 206 may receive an indication of an event within buildings 10, retrieve information associated with the event, and trigger a set of predefined workflows to perform management policies. In various embodiments, event processing 206 includes complex event processing and/or a business workflow processing engine (e.g., a rules engine, etc.) integrated with messaging and data models (e.g., event data models, etc.).

In various embodiments, building data platform 200 includes data source(s) 208. For example, data source(s) 208 may include data associated with people, places, assets, and/or the like. In various embodiments, building data platform 200 interacts with digital twins included in entity graph 170. For example, building data platform 200 may project a digital twin into a virtual data view to facilitate service(s) 204. Data source(s) 208 may manage a database view of digital representation of people, places and assets. In various embodiments, data source(s) 208 represent heterogenous source data schema as an open source common data model (e.g., a Brick Schema/extensions, etc.).

In various embodiments, entity graph layer 240 includes digital twin 210 and context information 212. Digital twin 210 is a digital representation of spaces, assets, people, events, and/or anything associated with a building or operation thereof. In various embodiments, digital twin 210 is modeled in entity graph 170. In various embodiments, digital twins 210 include an active compute process. For example, a digital twin 210 may communicate with other digital twins 210, and to sense, predict and acts. In various embodiments, digital twin 210 is generated dynamically. For example, a digital twin 210 corresponding to a conference room may update its status by looking at occupancy sensors or an electronic calendar (e.g., to turn its status "available" if there is no show, etc.). In various embodiments, digital twin 210 and/or entity graph 170 include context information 212. Context information 212 may include real-time data and a historical record of each system in the environment (e.g., campus, building, facility, space, etc.). Context information 212 may be stored in entity graph 170. In various embodiments, context information 212 facilitates flexible data modeling for advanced analytics and AI application in scenarios that model highly interconnected entities.

In various embodiments, building data platform 200 includes data management 214 and/or operation(s) 216. Data management 214 may manage, retrieve, and transmit data to various systems. For example, data management 214 may retrieve and transmit data integration protocols to OT sub-systems. Operation(s) 216 may include data storage attribution, schema management, smart entity management, information integration, schema transformation, intelligent messaging, batch analytics, stream analysis, and/or device assurance.

In various embodiments, building data platform 200 includes administration and monitoring 220 and/or identity and security 230. Administration and monitoring 220 may facilitate various administrative functions and/or operations. For example, an administrator may view memory allocation analytics associated with building data platform 200 (e.g., how much memory does entity graph 170 occupy, etc.). Identity and security 230 may facilitate various security features. For example, identity and security 230 may encrypt personally identifiable information (PII) included in digital twin 210.

Figure 3A:
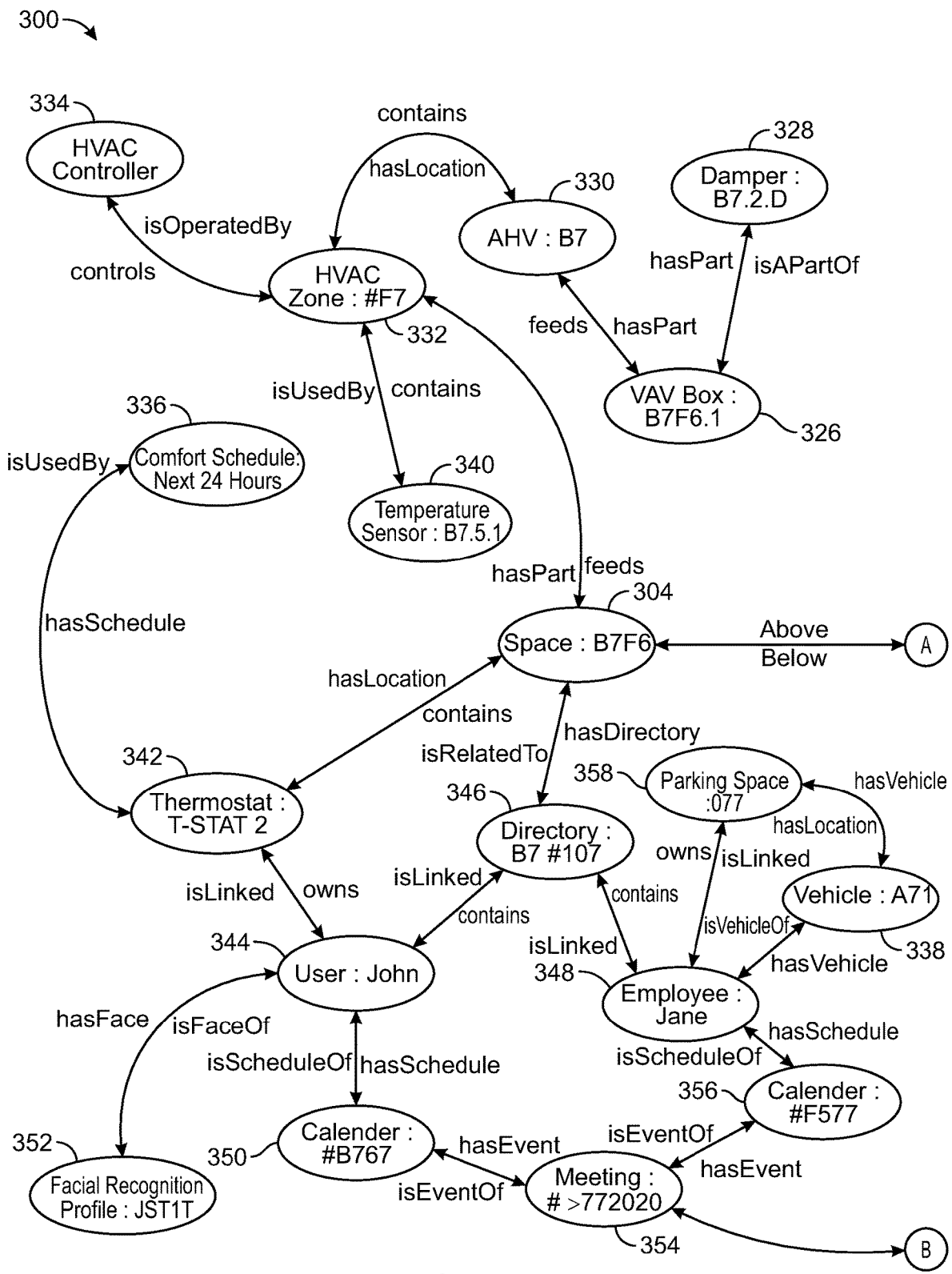
FIG. 3A is a block diagram of an entity graph, according to an exemplary embodiment.
Figure 3B:
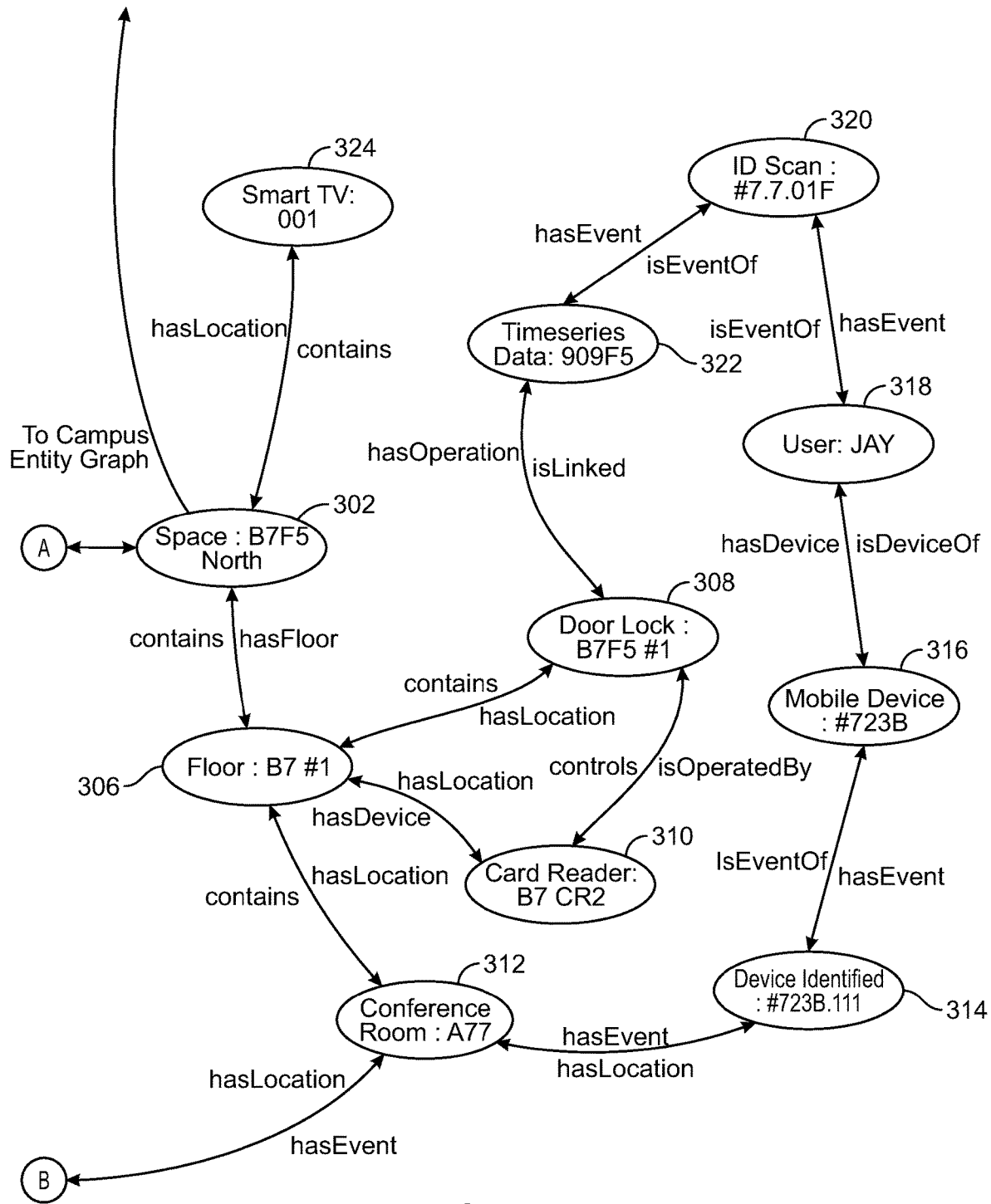
FIG. 3B is another block diagram of the entity graph of FIG. 3A, according to an exemplary embodiment.

Referring now to FIGS. 3A-3B, an entity graph 300 is shown in greater detail, according to an exemplary embodiment. In brief overview, entity graphs such as entity graph 170 and/or entity graph 300 are structured data stored in memory (e.g., a database, memory 146, etc.). Entity graphs such as entity graph 300 and/or entity graph 170 may include digital twins. Digital twins may be digital representations of real world spaces, equipment, people, and/or events. In various embodiments, digital twins represent buildings, building equipment, people associated with buildings, and/or events associated with buildings (e.g., buildings 10, etc.). An entity graph may include nodes and edges, where each node of the entity graph represents an entity and each edge is directed (e.g., from a first node to a second node) and represents a relationship between entities (e.g., indicates that the entity represented by the first node has a particular relationship with the entity represented by the second node). For example, an entity graph may be used to represent a digital twin of a person.

Entities can be things and/or concepts related to spaces, people, and/or asset. For example, the entities could be "B7F4 North", "Air Handling Unit," and/or "meeting room." The nodes can represent nouns while the edges can represent verbs. For example, the edges can be "isA," "hasPart," and/or "feeds." In various embodiments, the edges represent relationships. While the nodes represent the building and its components, the edges describe how the building operates. The nodes and edges together create a digital twin of a particular building. In some embodiments, the entities include properties or attributes describing the entities (e.g., a thermostat may have a particular model number attribute). The components of the entity graph form large networks that encode semantic information for a building.

The entity graph is configured to enable flexible data modeling for advanced analytics, control, and/or artificial intelligence applications, in some embodiments. These applications may require, or benefit from information modeling including interconnected entities. Other data modeling techniques based on a table, a hierarchy, a document, and/or a relational database may not be applicable. The entity graph can be a foundational knowledge management layer to support other higher level applications, which can be, complex root cause, impact analysis, building powerful recommendation engines, product taxonomy information services, etc. Such a multilayer system, a system of system topologies, can benefit from an underlying entity graph.

The entity graph can be a data contextualization layer for all traditional and/or artificial intelligence applications. The entity graph can be configured to capture evidence that can be used to attribute the strengths of entity relationships within the entity graph, providing the applications which utilize the entity graph with context of the systems they are operating. Without context (e.g., who the user is, what the user is looking for, what the target of a user request is, e.g., find a meeting room, increase a temperature in my office) these applications may never reach their full potential. Furthermore, the entity graph provides a native data structure for constructing question and answer type systems, e.g., a chatbot, that can leverage and understand intent.

The entity graph may not be a configuration database but may be a dynamic representation of a space, person, event, and the like. The entity graph can include operational data from entities which it represents, e.g., sensors, actuators, card access systems, occupancy of a particular space, thermodynamics of the space as a result of actuation, etc. The entity graph can be configured to continually, and/or periodically, ingest new data of the space and thus the entity graph can represent a near real-time status of cyber-physical entities and their inter-relationships. For this reason, artificial intelligence can be configured to introduce a virtual entity and new semantic relationships among entities, in some embodiments.

The entity graph is configured to facilitate adaptive controls, in some embodiments. The entity graph can be configured to adapt and learn over time. The entity graph can be configured to enable dynamic relationships between building information and other facility and enterprise systems to create new insights and drive new optimization capabilities for artificial intelligence systems. As relationships can be learned over time for the entity graph, the artificial intelligence systems and also learn overtime based on the entity graph. Entity graphs (e.g., space graphs, etc.) are described in greater detail with reference to U.S. patent application Ser. No. 16/260,078, filed on Jan. 28, 2019, the entire disclosure of which is incorporated by reference herein.

Entity graph 300 includes entities 302-358 (stored as nodes within entity graph 300) describing spaces, equipment, events, and people (e.g., business employees, etc.). In various embodiments, entities 302-358 are associated with or otherwise include agents (e.g., agents may be assigned to/associated with entities, etc.). Additionally or alternatively, agents may be represented as nodes in entity graph 300 (e.g., agent entities, etc.). Furthermore, relationships are shown between entities 302-358 directionally describing relationships between two of entities 302-358 (stored as edges within entity graph 300). In various embodiments, cloud building management platform 140 may traverse entity graph 300 to retrieve a description of what types of actions to take for a certain device, what the current status of a room is (e.g., occupied or unoccupied), etc.

As an example, entity graph 300 illustrates an office space called "B7F5 North" of a building. A smart TV referred to as "Smart TV 001" has a directional relationship to the space referred to as "B7F5 North." The relationship may be an edge "hasLocation" indicating that the device (e.g., the smart TV represented by entity 324) has a location (e.g., the space represented by entity 302). Furthermore, a second edge "contains" from entity 302 to entity 324 indicates that the location (e.g., the space represented by entity 302) includes the device (e.g., the smart TV represented by entity 324). In some embodiments, entity graph circuit 150 generates the nodes of entity graph 300 from various data sources including a building automation system, a security system, a fire alarm, human resources system, and/or building information model (BIM) files (e.g., through an entity name matching process, etc.). Furthermore, semantic relationships may be extracted from the building information by entity graph circuit 150. In some embodiments, only a single relationship exists between entities. In some embodiments, nodes and edges are determined dynamically as building data that is received and ingested into entity graph 300. For example, cloud building management platform 140 is configured to identify a door lock and card reader and generate a number of nodes and edges in entity graph 300 representing the card reader controller operation of the door lock.

Smart Parking Lot System

Various embodiments disclosed herein describe example implementations of a smart parking lot system. The smart parking lot systems described herein may facilitate individual user experiences. For example, a smart parking lot may identify a vehicle and/or a user associated with a vehicle and react based on the identified vehicle and/or user. In some embodiments, a smart parking lot may identify a vehicle, determine that an assigned parking space in the smart parking lot corresponds to the vehicle, and grant the vehicle access to the assigned parking space. In various embodiments, the smart parking lot system described herein may integrate/interface with an external system (e.g., BMS 102, cloud building management platform 140, entity graph 170, etc.). For example, a smart parking lot may reference entity graph 170 to facilitate vehicle and/or user identification. In various embodiments, the smart parking lot system described herein facilitates frictionless access to a campus, building, parking lot, and/or parking space. Additionally or alternatively, the smart parking lot system described herein may facilitate resource (e.g., time, space, energy, money, travel distance, user satisfaction, etc.) optimization. For example, a smart parking lot may dynamically assign parking spaces to users based on context information of the users (e.g., a user who is running late for a meeting may be assigned a parking space within a short walking distance to the meeting, etc.).

As a non-limiting example, a smart parking lot may detect the presence of a vehicle near an access control device (e.g., a vehicle gate, etc.) associated with the smart parking lot. The smart parking lot may capture an image of the license plate of the vehicle and thereby determine a license plate number of the vehicle. Using the license plate number, the smart parking lot may determine an individual associated with the vehicle (e.g., via the entity graph 170). The smart parking lot may retrieve context information associated with the individual. For example, the smart parking lot may retrieve access rights and a schedule of the individual. The smart parking lot may determine, based on the schedule of the individual, that the individual has an upcoming meeting. Furthermore, the smart parking lot may determine, based on the access rights of the individual, that the individual is authorized for a parking space in the smart parking lot. The smart parking lot may analyze the context information and parking demands associated with a time period the individual is expected to be in the smart parking lot (e.g., currently assigned parking spaces, parking space amenities, etc.) and dynamically assign the individual a parking space. For example, the context information may indicate that the individual is physically disabled and the smart parking lot may assign the individual an available parking space nearby to an elevator that travels to a floor that includes a conference room corresponding to the upcoming meeting. The smart parking lot may control access control devices to grant the vehicle access to the assigned parking space. Additionally or alternatively, the smart parking lot may display directions to the individual describing a route to the assigned parking space. In some embodiments, the smart parking lot may display turn-by-turn directions on digital signage located throughout the smart parking lot.

As another non-limiting example, a smart parking lot may detect the presence of a mobile device near a drop-off location associated with the smart parking lot. For example, the smart parking lot may detect the mobile device using near-field-communication (NFC), Bluetooth, WiFi, cellular connections (e.g., via a 4G or 5G access point/small cell base station). The smart parking lot may receive an identifier from the mobile device. Using the identifier, the smart parking lot may determine an individual associated with the mobile device (e.g., via the entity graph 170). The smart parking lot may retrieve context information associated with the individual. For example, the smart parking lot may retrieve an organizational role (e.g., title, position, organizational seniority, etc.) and historical information associated with the individual. The smart parking lot may determine, based on the organizational role of the individual, that the individual is a very-important-person (VIP). Furthermore, the smart parking lot may determine, based on the historical information associated with the individual, that the individual has never before visited a building associated with the smart parking lot. The smart parking lot may analyze the context information and notify an employee escort that the individual has arrived at the building. The employee escort may respond to the notification with a personalized message and directions for the individual and the smart parking lot may display the personalized message and directions to the individual. For example, the smart parking lot may display the personalized message and directions on digital signage located nearby the drop-off location.

As another non-limiting example, a smart parking lot may detect information associated with vehicles using the smart parking lot. For example, the smart parking lot may capture an image of the vehicles and use feature recognition to determine a make and model of the vehicles. The smart parking lot may generate a data structure recording the information associated with the vehicles using the smart parking lot. Using the data structure, the smart parking lot may generate a model of the user population of the smart parking lot. For example, the model may include how many vehicles use the smart parking lot over time. Additionally or alternatively, the model may include types of vehicles (e.g., electric, combustion-engine, etc.) that use the smart parking lot. The smart parking lot may analyze the model and determine changes in the user population of the smart parking lot. In some embodiments, the smart parking lot may determine that a large portion of the user population includes electric vehicles. Based on the determined changes in the user population, the smart parking lot may dynamically suggest changes to the smart parking lot. For example, the smart parking lot may suggest installing more electric chargers in the smart parking lot based on determining that a large portion of the user population includes electric vehicles. Additionally or alternatively, the smart parking lot may suggest increasing a price of parking spaces during winter months based on determining that a demand for parking in the smart parking lot increases during winter months.

As another non-limiting example, a smart parking lot may monitor resource consumption associated with the smart parking lot. For example, the smart parking lot may monitor an electricity consumption associated with the smart parking lot. Additionally or alternatively, the smart parking lot may monitor resource consumption associated with a facility associated with the smart parking lot (e.g., an attached building, etc.). For example, the smart parking lot may receive an electricity consumption associated with an attached building from a building management system of the attached building. The smart parking lot may analyze the resource consumption to determine actions. For example, for a smart parking lot sharing an electrical transformer with an attached building, the smart parking lot may determine, based on the electricity consumption associated with the smart parking lot and the electricity consumption associated with the attached building, that an additional load associated with electric vehicle charging would overload the electrical transformer. Based on the determination, the smart parking lot may transmit a notification to users of the smart parking lot indicating that electric vehicle charging is unavailable until electrical demand associated with the smart parking lot and the attached building decreases to an acceptable level.

Figure 4A:
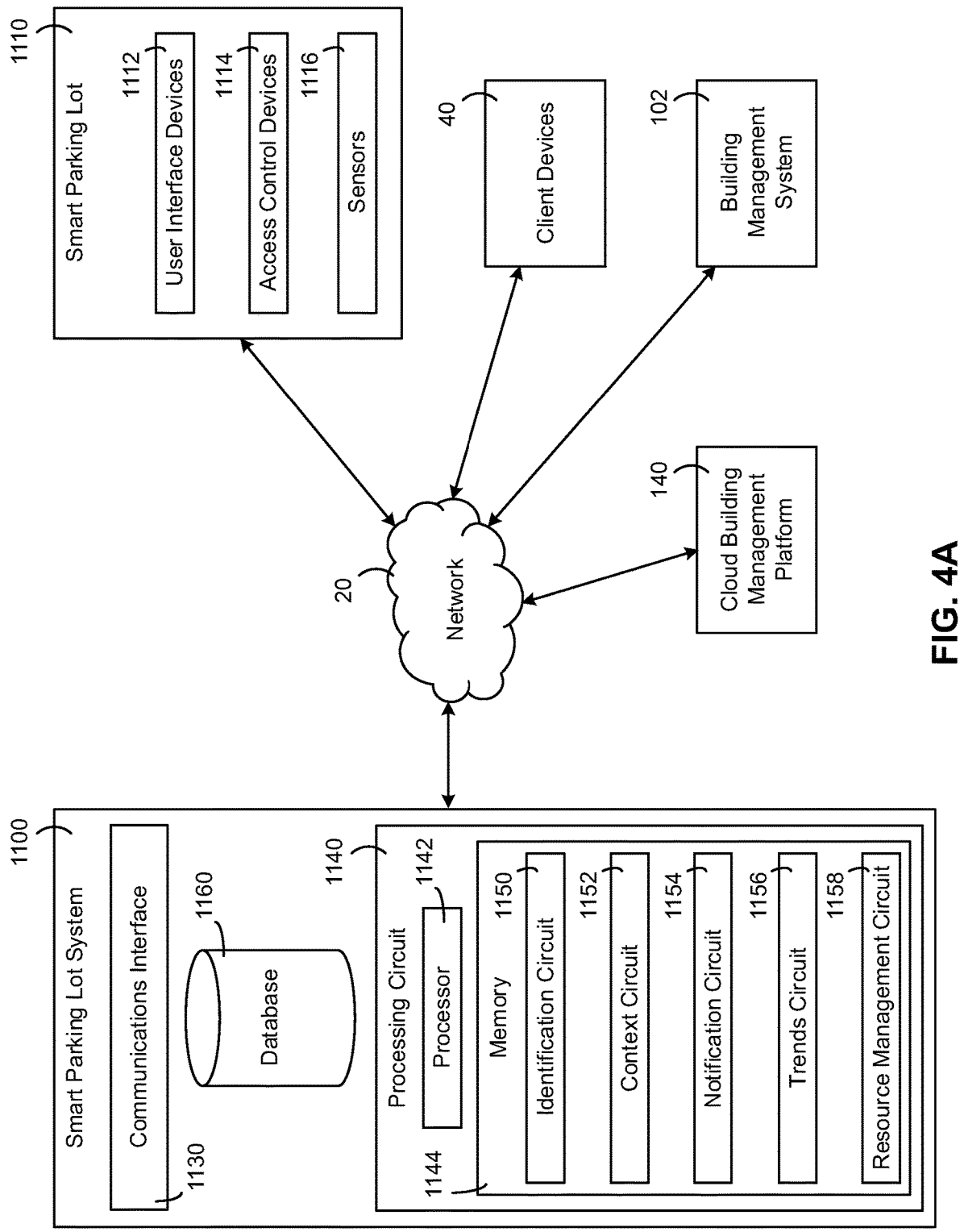
FIG. 4A is a block diagram of a parking lot management system, according to an exemplary embodiment.
Figure 4B:
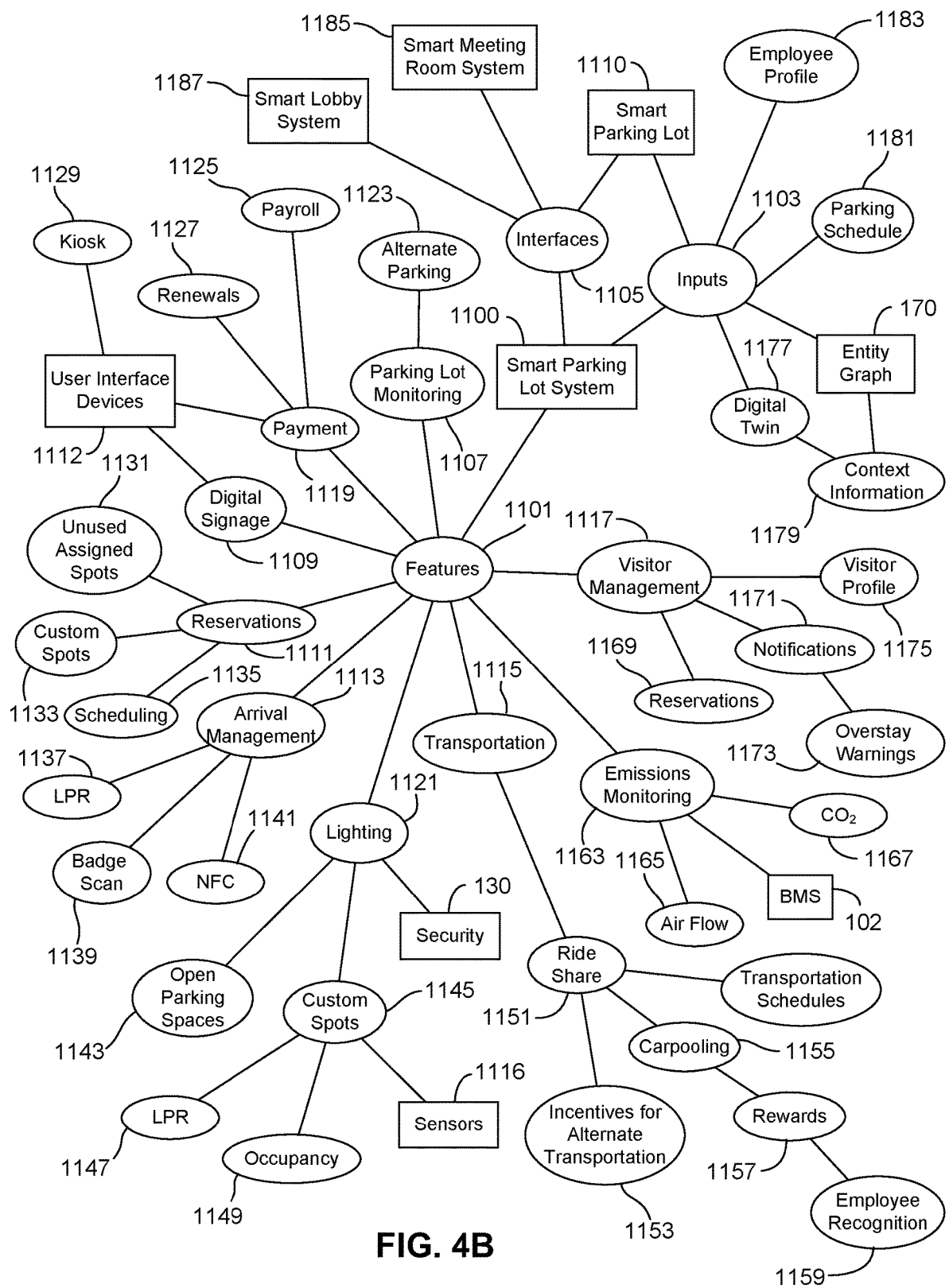
FIG. 4B is a node graph illustrating connections between features and components of the parking lot management system of FIG. 11A, according to an exemplary embodiment.

Referring now to FIGS. 4A-4B, a parking lot management system including smart parking lot system 1100 is shown, according to an exemplary embodiment. In various embodiments, smart parking lot system 1100 is configured to manage various processes associated with scheduling, assigning, and implementing parking in a parking lot as well as improvements thereto. For example, smart parking lot system 1100 is configured to identify an individual associated with a vehicle entering smart parking lot 1110, retrieve context information associated with the individual, dynamically assign the individual a parking space based on the context information, and direct the individual to the parking space. As another example, smart parking lot system 1100 is configured to detect when an individual has arrived at an assigned parking space, determine an interested party (e.g., an employee escort, etc.), and notify the interested party that the individual has arrived. In various embodiments, smart parking lot system 1100 is configured to communicate with external systems via network 20. For example, smart parking lot system 1100 may communicate with client devices 40, building management system 102, cloud building management platform 140, and smart parking lot 1110.

In various embodiments, smart parking lot system 1100 implements and/or facilitates various features 1101 (e.g., as shown in FIG. 4B, etc.). For example, smart parking lot system 1100 may implement emissions monitoring 1163 in smart parking lot 1110, reservations scheduling 1111 (e.g., managing and reserving parking spaces within smart parking lot 1110, etc.), digital signage control 1109 (e.g., controlling digital signage located in smart parking lot 1110, etc.), lighting control 1121 (e.g., controlling lighting within smart parking lot 1110, etc.), transportation management 1115, arrival management 1113 (e.g., generating notification in response to detecting an employee arrive at work, directing visitors, etc.), payment management 1119 (e.g., receiving and processing payment for use of smart parking lot 1110, etc.), parking monitoring 1107 (e.g., monitoring vehicles/individuals using smart parking lot 1110, etc.), and/or visitor management 1117 (e.g., identifying visitors, communicating with visitors, building a profile of visitors, etc.). In some embodiments, smart parking lot system 1110 facilitates alternate parking 1123. For example, smart parking lot system 1110 may determine that a parking lot is full and direct individuals to alternative parking (e.g., another parking lot nearby, etc.). In some embodiments, smart parking lot system 1110 facilitates renewals 1127 of parking spaces. For example, a user may select a payroll 1125 option to have parking expense (e.g., monthly rent, etc.) automatically deducted from their salary. Additionally or alternatively, smart parking lot system 1110 may include kiosks 1129 to facilitate processing payments. In some embodiments, smart parking lot system 1100 includes digital signage 1109 to display information to users (e.g., directions, instructions, etc.).

In some embodiments, smart parking lot system 1100 facilitates use of unused assigned spots 1131. For example, smart parking lot system 1100 may determine that an individual is not planning on using their assigned parking space (e.g., by detecting an out of office setting on an electronic calendar of the user, by receiving occupancy data from sensors 1116, etc.) during a time period and may reassign the parking space to other individuals during the time period. In some embodiments, smart parking lot system 1100 facilitates parking lot scheduling 1135. For example, smart parking lot system 1100 may analyze user arrival times and direct the users to reduce traffic congestion (e.g., disperse assigned parking space so that multiple vehicles don't have to access the same part of the parking lot at the same time, etc.). In some embodiments, smart parking lot system 1100 facilitates license plate recognition 1137. For example, smart parking lot system 1100 may grant a vehicle access to smart parking lot 1110 based on identifying a license plate of the vehicle and/or may identify a custom parking space for the vehicle based on identifying a license plate of the vehicle. In some embodiments, smart parking lot system 1100 facilitates badge scanning 1139. For example, an employee may scan an identifier badge to gain access to smart parking lot 1110. Additionally or alternatively, an employee may be detected via near-field-communication 1141. For example, smart parking lot system 1100 may detect a NFC device mounted to an individual's vehicle and grant the individual access to smart parking lot 1110.

In some embodiments, smart parking lot system 1100 facilitates lighting open parking spaces 1143. For example, smart parking lot system 1100 may illuminate all open parking spaces. In some embodiments, smart parking lot system 1100 facilitates occupancy sensing 1149. For example, smart parking lot system 1100 may determine if a user has arrived at their custom parking space via sensors 1116 and greet the user. In some embodiments, smart parking lot system 1100 facilitates ride share features 1151. For example, smart parking lot system 1100 may retrieve and display transportation schedules 1161 (e.g., bus schedules, train schedules, ride-sharing service prices, etc.). As a further example, smart parking lot system 1100 may generate rewards 1157 for carpooling 1155. For example, smart parking lot system 1100 may facilitate employee recognition 1159 for those that carpool (e.g., via a group-email, group reception, parties, etc.). In some embodiments, smart parking lot system 1100 may facilitates incentives for alternate transportation 1153. For example, smart parking lot system 1100 may offer coupons to employees that carpool. In some embodiments, smart parking lot system 1100 monitors air flow 1165 and/or $CO_2$ 1167. For example, smart parking lot system 1100 may generate an alert if smart parking lot 1110 lacks fresh air (e.g., emissions levels are too high, etc.). In some embodiments, smart parking lot system 1100 facilitates parking space reservations 1169. For example, a visitor may reserve a parking space for a visit to building 10. In some embodiments, smart parking lot system 1100 facilitates notifications 1171. For example, smart parking lot system 1100 may generate overstay warnings 1173 to users when their parking reservation is about to expire. In some embodiments, smart parking lot system 1100 retrieves visitor profiles 1175. For example, smart parking lot system 1100 may retrieve a visitor profile from a calendar invite to determine a license plate associated with a vehicle of the visitor.

In various embodiments, smart parking lot system 1100 is integrated with inputs 1103. For example, smart parking lot system 1100 may receive information from smart parking lot 1110, employee profile(s) 1183, parking schedule 1181, entity graph 170, digital twin 1177, and/or context information 1179 as described herein. In various embodiments, smart parking lot system 1100 includes interfaces 1105. For example, smart parking lot system 1100 may interface with smart meeting room system 1185, smart parking lot 1110, and/or smart lobby system 1187. For example, smart parking lot system 1100 may receive meeting schedules and/or conference room locations from smart meeting room system 1185. As a further example, smart parking lot system 1100 may interface with smart lobby system 1187 to notify a lobby receptionist that a visitor has arrived in smart parking lot 1110.

Smart parking lot 1110 may be any parking lot configured to communicate with smart parking lot system 1100. Smart parking lot 1110 may include user interface devices 1112, access control devices 1114, and/or sensors 1116. User interface devices 1112 may include displays, voice assistants, gesture detectors, tablets, control panels, remotes, and/or any other user interface device/systems. In various embodiments, a user may interact with smart parking lot 1110 and/or smart parking lot system 1100 via user interface devices 1112. For example, a user may check-in at an access gate of smart parking lot 1110 using user interface devices 1112. In some implementations, user interface devices 1112 may not be a part of smart parking lot system 1100, but may be user devices such as smartphones from which smart parking lot system 1100 receives input data. Access control devices 1114 may include gates, turnstiles, ramps, doors, barriers, and/or any other devices or structures configured to control access to smart parking lot 1110. Sensors 1116, may include occupancy sensors, cameras, biometric sensors, light sensors, weight sensors, temperature sensors, microphones, and any other type of sensor. In various embodiments, sensors 1116 collect information about a vehicle and/or individual in or around smart parking lot 1110 and transmit the information to smart parking lot system 1100. For example, sensors 1116 may capture an image of a vehicle entering smart parking lot 1110, determine a make and model of the vehicle, and transmit the make and model information to smart parking lot system 1100. In some embodiments, sensors 1116 include emissions sensors. For example, sensors 1116 may detect $CO_2$ levels within smart parking lot 1110 and smart parking lot system 1100 may control BMS 102 to increase fresh airflow to smart parking lot system 1100.

Smart parking lot system 1100 includes communications interface 1130, processing circuit 1140, and database 1160. Communications interface 1130 is configured to facilitate communication between smart parking lot system 1100 and external systems. For example, communications interface 1130 may facilitate communication between smart parking lot system 1100 and smart parking lot 1110. In some embodiments, communications interface 1130 is similar to communications interface 104 described above with reference to FIG. 1A. Database 1160 is configured to store information associated with smart parking lot system 1100. For example, smart parking lot system 1100 may determine a model of a user population of smart parking lot 1110 and may store the model in database 1160. Database 1160 may be internal storage or external storage. For example, database 1160 may be internal storage with relation to smart parking lot system 1100, and/or may include a remote database, cloud-based data hosting, or other remote data storage.

Processing circuit 1140 includes processor 1142 and memory 1144. Smart parking lot system 1100 may include one or more processing circuits 1140 including one or more processors 1142 and one or more memories 1144. Each of the processors 1142 can be a general purpose or specific purpose processor, an application specific integrated circuit (ASIC), one or more field programmable gate arrays (FPGAs), a group of processing components, or other suitable processing components. Each of the processors 1142 is configured to execute computer code or instructions stored in memory 1144 or received from other computer readable media (e.g., CDROM, network storage, a remote server, etc.).

Memory 1144 may include one or more devices (e.g., memory units, memory devices, storage devices, or other computer-readable media) for storing data and/or computer code for completing and/or facilitating the various processes described in the present disclosure. Memory 1144 may include random access memory (RAM), read-only memory (ROM), hard drive storage, temporary storage, non-volatile memory, flash memory, optical memory, or any other suitable memory for storing software objects and/or computer instructions. Memory 1144 may include database components, object code components, script components, or any other type of information structure for supporting the various activities and information structures described in the present disclosure. Memory 1144 may be communicably connected to processor(s) 1142 via processing circuit 1140 and may include computer code for executing (e.g., by processor 1142) one or more processes described herein.

Memory includes identification circuit 1150, context circuit 1152, notification circuit 1154, trends circuit 1156, and resource management circuit 1158. Identification circuit 1150 may receive data from sensors 1116 and identify vehicles and/or individuals. For example, identification circuit 1150 may receive an image of a vehicle license plate and identify a license plate number from the image and an individual associated with the license plate number. In some embodiments, identification circuit 1150 may use image recognition to determine a license plate number based on an image, search a graph structure using the license plate number to determine an individual having a vehicle with the license plate number, and retrieve a digital twin of the individual (e.g., structured data associated with/representing the individual, etc.). In various embodiments, identification circuit 1150 queries structured data to facilitate identification. For example, identification circuit 1150 may query entity graph 170 with biometric data (e.g., facial image data, etc.) to identify an individual. As a further example, identification circuit 1150 may query a database of digital twins to identify an individual having a specific assigned parking space. In some embodiments, identification circuit 1150 identifies individuals using biometric data. For example, identification circuit 1150 may use facial recognition and/or voice recognition to identify an individual dropped off at a drop-off location nearby smart parking lot 1110. Additionally or alternatively, identification circuit 1150 may identify an individual using information received from a mobile device associated with the individual. For example, identification circuit 1150 may detect a mobile phone using NFC, receive an identifier from the mobile phone, and search a graph structure (e.g., entity graph 170, etc.) to determine an individual associated with the mobile phone.

Context circuit 1152 is configured to analyze context information associated with an identified individual. For example, context circuit 1152 may analyze a schedule of an individual, determine that the individual has a meeting that they are late for, and facilitate assigning the individual a parking space that is close to a location of the meeting. As a further example, context circuit 1152 may analyze a digital twin associated with an individual, determine that the individual is mobility restricted, and identify personnel to assist the individual. In various embodiments, context circuit 1152 may assign parking spaces for vehicles and/or individuals. For example, context circuit 1152 may analyze parking demands associated with smart parking lot 1110 (e.g., previously assigned spaces, parking demand, etc.) to determine a parking space for a visitor. In some embodiments, entity graph 170 includes context information. As a further example, context circuit 1152 may facilitate custom parking spaces 1133 (e.g., parking spaces customized to an individual, etc.). For example, context circuit 1152 may identify that an individual has a custom parking space and smart parking lot system 1100 may assign the individual to the custom parking space. Custom parking spaces may be parking spaces customized to an individual. For example, a custom parking space may include individualized signage, lighting, audio greeting, appearance, and the like. In some embodiments, context circuit 1152 facilitates ride share incentives. For example, context circuit 1152 may determine when a user has engaged in ride sharing (e.g., use of public transportation, carpooling, etc.) and may generate a reward for the user (e.g., a public recognition email, monetary reward, etc.).

Notification circuit 1154 is configured to generate and transmit notifications. For example, notification circuit 1154 may receive an indication that an individual has arrived at smart parking lot 1110 and receive an indication of an interested person and generate a notification to the interested person indicating that the individual has arrived at smart parking lot 1110. In some embodiments, notification circuit 1154 may receive sensor data from sensors 1116 indicating that an individual has arrived at an assigned parking space, receive context information including an identity of an interested person, and transmit a notification to the interested person indicating a location of the individual. Additionally or alternatively, notification circuit 1154 may control user interface devices 1112. For example, user interface devices 1112 may include digital signage located throughout smart parking lot 1110 and notification circuit 1154 may be configured to transmit user interface elements to the digital signage for displaying to viewers. For example, notification circuit 1154 may control user interface devices 1112 to display turn-by-turn directions to an individual driving a vehicle to guide the individual to an assigned parking space. In various embodiments, notification circuit 1154 facilitates two-way communication. For example, notification circuit 1154 may send a notification to an employee indicating that a guest of the employee has arrived at smart parking lot 1110, may receive a response from the employee (e.g., a personalized message, etc.), and may display the response to the guest (e.g., via user interface devices 1112, etc.). In some embodiments, user interface devices 1112 include lights. For example, smart parking lot system 1100 may control lights within smart parking lot 1110 to guide users to an exit in the event of an emergency. As a further example, smart parking lot system 1100 may control lights to illuminate a parking space assigned to an individual. Additionally or alternatively, user interface devices 1112 may include kiosks. For example, smart parking lot 1110 may include kiosks to facilitate payment for use of smart parking lot 1110. In some embodiments, an employee may renew a parking pass using a kiosk and have the cost of renewal deducted from their pay automatically. In some embodiments, user interface devices 1112 may direct users to alternate parking. For example, smart parking lot system 1100 may detect that smart parking lot 1100 is full and control digital signage to direct arriving vehicles to an alternate parking lot. In some embodiments, notification circuit 1154 may notify a user when their parking time is about to expire. For example, a user may have a two hour parking pass, smart parking lot system 1100 may determine that the parking pass expires in ten minutes, and notification circuit 1154 may send a text-message to a mobile device associated with the user indicating that the parking pass is about to expire.

Trends circuit 1156 is configured to monitor a user population of smart parking lot 1110 and determine trends associated with smart parking lot 1110. For example, trends circuit 1156 may receive an indication of a make and model of vehicles entering smart parking lot 1110, generate a model of a user population of smart parking lot 1110, and determine actions based on the model. In some embodiments, trends circuit 1156 may generate a model of a user population of smart parking lot 1110, determine that there is increased demand for use of smart parking lot 1110, and generate a suggestion to increase a price associated with smart parking lot 1110 based on the increased demand. In various embodiments, the model of smart parking lot 1110 is a digital twin of smart parking lot 1110. For example, trends circuit 1156 may build an entity graph (e.g., such as entity graph 170, etc.) corresponding to smart parking lot 1110 and a user population of smart parking lot 1110. In some embodiments, trends circuit 1156 may build an entity graph including a make and model of vehicles using smart parking lot 1110, may analyze the entity graph over time to determine that a demand for electric vehicle charging is on track to exceed a supply of electric vehicle charging, and may generate a recommendation to install more electric vehicle charging stations in smart parking lot 1110 to meet the expected demand.

Resource management circuit 1158 is configured to monitor resource consumption associated with smart parking lot 1110 and/or associated entities (e.g., building 10, etc.) and generate notifications. For example, resource management circuit 1158 may monitor an electricity usage of building 10 and smart parking lot 1110, determine that a power supply suppling power to building 10 and smart parking lot 1110 cannot support an additional load associated with electric vehicle charging, and may transmit a notification to users of smart parking lot 1110 that electric vehicle charging will not be offered in smart parking lot 1110 at this time. Additionally or alternatively, resource management circuit 1158 may be configured to integrate smart parking lot 1110 into an energy optimization system associated with building 10. For example, resource management circuit 1158 may at least partially couple to building management system 102 and electrical subsystem 126 may analyze energy consumption of building 10 and smart parking lot 1110 to facilitate efficient resource distribution/usage. In various embodiments, resource management circuit 1158 at least partially integrates with a digital twin of smart parking lot 1110 and/or building 10 to facilitate resource management. For example, resource management circuit 1158 may generate an entity graph (e.g., entity graph 170, etc.) including resource consumption information associated with smart parking lot 1110.

Figure 5:
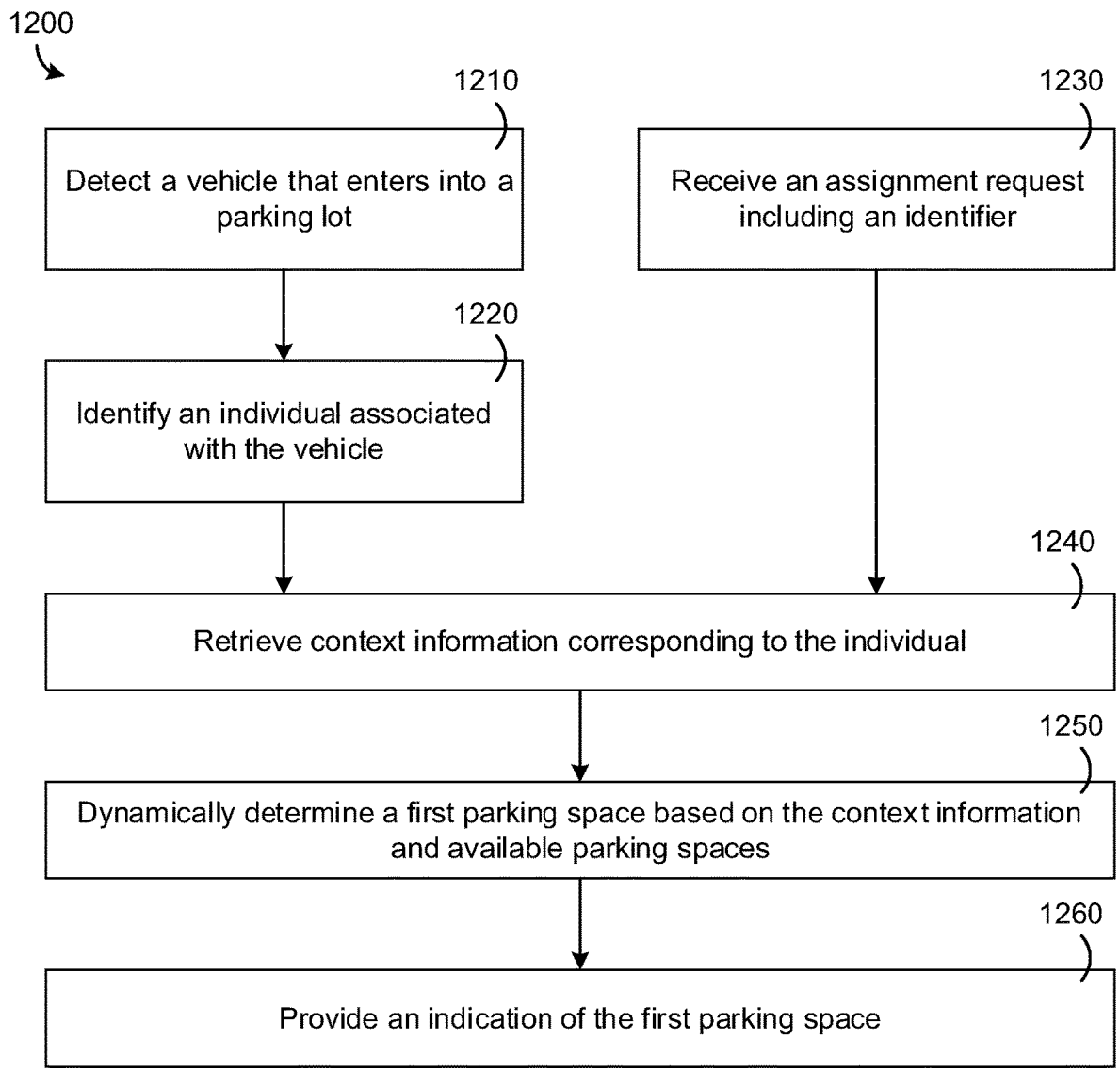
FIG. 5 is a flow diagram of a method of dynamically determining a parking space, according to an exemplary embodiment.

Referring now to FIG. 5, a method 1200 of dynamically determining a parking space is shown, according to an embodiment. In various embodiments, smart parking lot system 1100 at least partially implements method 1200. At step 1210, smart parking lot system 1100 detects a vehicle that enters into a parking lot. In various embodiments, the parking lot is smart parking lot 1110. In various embodiments, step 1210 includes smart parking lot system 1100 receiving sensor data from sensors 1116. For example, a motion detector positioned near an entrance to smart parking lot 1110 may detect a vehicle entering smart parking lot 1110 and send an indication to smart parking lot system 1100. Additionally or alternatively, smart parking lot system 1100 may receive position data from a mobile device associated with a vehicle and/or individual. For example, smart parking lot system 1100 may receive GPS data from a client device 40 associated with an individual indicating that the individual is at an entrance to smart parking lot 1110.

At step 1220, smart parking lot system 1100 identifies an individual associated with the vehicle. In various embodiments, step 1220 includes smart parking lot system 1100 receiving sensor data from sensors 1116. For example, sensors 1116 may capture an image of the vehicle and send the image to smart parking lot system 1100. In various embodiments, smart parking lot system 1100 may use image recognition to identify a license plate number from the image. Additionally or alternatively, smart parking lot system 1100 may use image recognition to identify a biometric feature associated with an individual in the vehicle. For example, smart parking lot system 1100 may use facial recognition to identify a face of a driver of the vehicle. In various embodiments, step 1220 includes querying a database (e.g., entity graph 170, a digital twin, etc.) using the sensor data. For example, smart parking lot system 1100 may receive image data, apply image recognition to identify a license plate number from the image data, and query entity graph 170 with the license plate number to identify an individual associated with the license plate number. As a further example, smart parking lot system 1100 may receive image data from sensors 1116, apply facial recognition to identify facial features from the image data, and query a database including digital twins to identify an individual based on the facial features. Additionally or alternatively, smart parking lot system 1100 may identify an individual associated with the vehicle using an identifier associated with the vehicle and/or the individual. For example, sensors 1116 may receive a NFC signal from a device associated with the vehicle and may query entity graph 170 using information from the NFC signal to identify the individual. As a further example, sensors 1116 may receive an identifier (e.g., a scanned barcode, etc.) from a mobile device associated with the individual (e.g., client devices 40, etc.) and query entity graph 170 using the identifier to identify the individual.

In various embodiments, method 1200 includes steps 1210 and 1220 or step 1230. In some embodiments, method 1200 includes steps 1210, 1220, and 1230. At step 1230, smart parking lot system 1100 receives an assignment request including an identifier. For example, smart parking lot system 1100 may receive a request for a parking space from a mobile device (e.g., a client device 40, etc.). In some embodiments, a visitor may receive an electronic calendar invitation to a meeting at building 10 and may generate a parking space request that is sent to smart parking lot system 1100 including an identifier associated with the visitor. For example, the identifier may include a name of the visitor. In various embodiments, step 1230 includes identifying an individual based on the identifier. For example, smart parking lot system 1100 may query a database having digital twins to identify an individual based on the identifier. In some embodiments, smart parking lot system 1100 may query entity graph 170 using the identifier to identify the visitor.

At step 1240, smart parking lot system 1100 retrieves context information corresponding to the individual. In various embodiments, step 1240 includes querying entity graph 170 to retrieve a digital twin associated with the individual. In various embodiments, the digital twin includes information describing the individual. For example, the digital twin may include a schedule of the individual, physical characteristics of the individual (e.g., weight, hair color, facial features, physical impairments, etc.), a role and/or organizational role of the individual, an assigned parking space associated with the individual, health information associated with the individual, and/or any other information describing the individual. In some embodiments, step 1240 includes retrieving context information associated with smart parking lot 1110. For example, smart parking lot system 1100 may retrieve a digital twin of smart parking lot 1110. In various embodiments, the digital twin of smart parking lot 1110 includes parking demand information associated with smart parking lot 1110 and/or a parking availability schedule associated with smart parking lot 1110. For example, smart parking lot system 1100 may retrieve a schedule including an indication of available parking space associated with smart parking lot 1110.

At step 1250, smart parking lot system 1100 dynamically determines a first parking space based on the context information and available parking spaces. In various embodiments, smart parking lot system 1100 may at least partially implement a machine learning system to perform step 1250. In various embodiments, smart parking lot system 1100 dynamically determines the first parking space by determining a first parking space that best suits the individual given the context information. For example, smart parking lot system 1100 may retrieve context information indicating that an individual is late for a meeting (e.g., by referencing a schedule of the individual, etc.) and may dynamically assign the individual a parking space that is within a short walking distance to a location of the meeting. As a further example, smart parking lot system 1100 may retrieve context information indicating that an individual has mobility difficulties (e.g., by referencing physical characteristics of the individual included in a digital twin of the individual, etc.) and may dynamically assign the individual a parking space that is nearby a mobility assistance device (e.g., a motorized scooter, etc.). In another example, smart parking lot system 1100 may retrieve context information including a role of the individual and assign a space based on the role (e.g., if the individual has a particular role, or a role above a certain threshold level in a corporate hierarchical structure, the individual may be assigned a particular parking space, such as one close to an elevator/door or one that is in a climate-controlled area).

At step 1260, smart parking lot system 1100 provides an indication of the first parking space. For example, smart parking lot system 1100 may send a notification to a mobile device associated with the individual (e.g., a client device 40, etc.). In some embodiments, a visitor may receive an electronic calendar invitation to a meeting at building 10, may generate a parking space request for smart parking lot system 1100, and may receive an email reservation from smart parking lot system 1100 including an assigned parking space. In some embodiments, step 1260 includes controlling user interface devices 1112. For example, smart parking lot system 1100 may control digital displays located throughout smart parking lot 1110 to display turn-by-turn directions to guide the individual to an assigned parking space.

Figure 6:
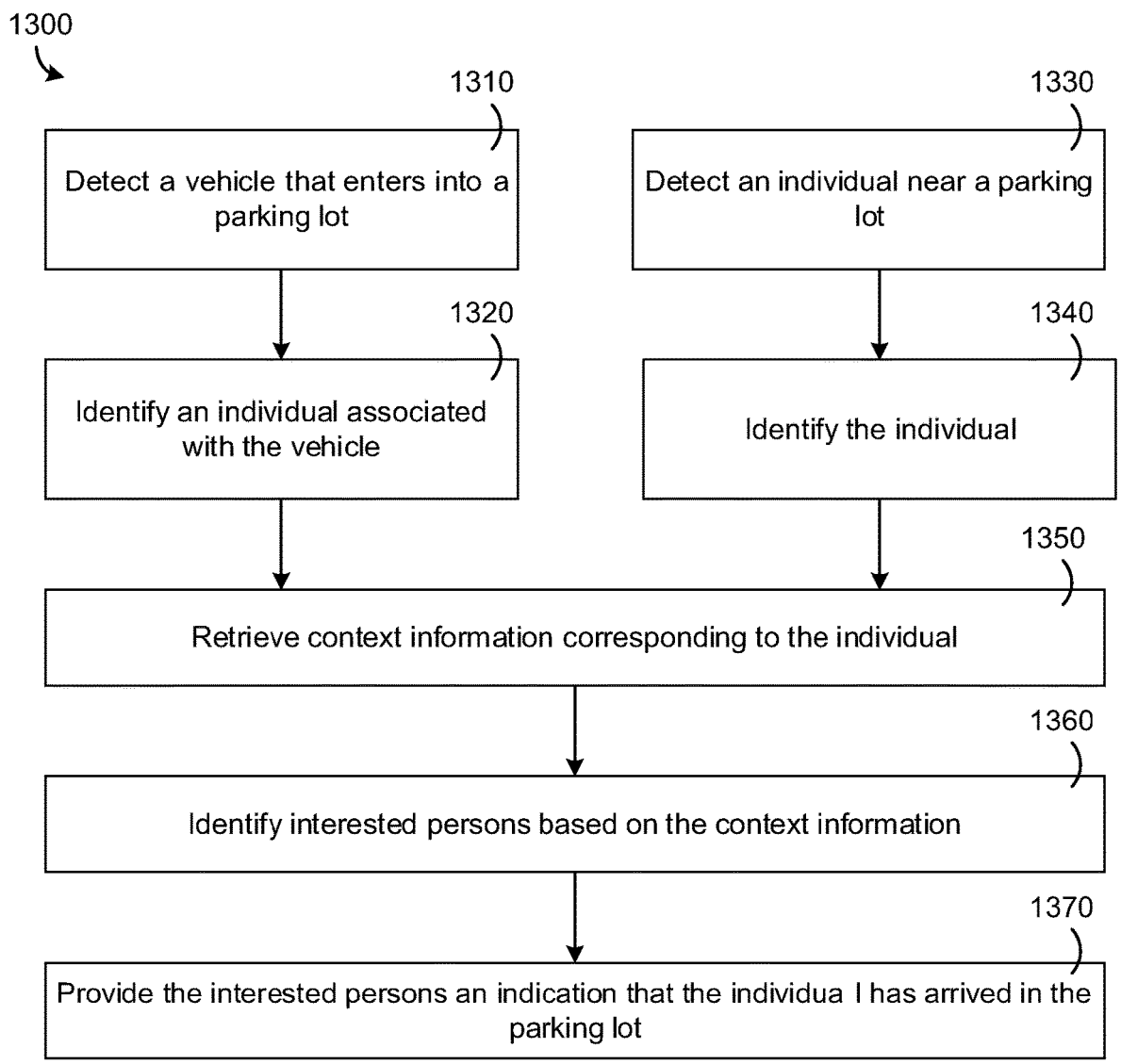
FIG. 6 is a flow diagram of a method of notifying an interested person, according to an exemplary embodiment.

Referring now to FIG. 6, a method 1300 of notifying an interested person is shown, according to an embodiment. In various embodiments, smart parking lot system 1100 at least partially implements method 1300. At step 1310, smart parking lot system 1100 detects a vehicle that enters into a parking lot. In various embodiments, the parking lot is smart parking lot 1110. In various embodiments, step 1310 includes smart parking lot system 1100 receiving sensor data from sensors 1116. For example, a motion detector positioned near an entrance to smart parking lot 1110 may detect a vehicle entering smart parking lot 1110 and send an indication to smart parking lot system 1100. Additionally or alternatively, smart parking lot system 1100 may receive position data from a mobile device associated with a vehicle and/or individual. For example, smart parking lot system 1100 may receive GPS data from a client device 40 associated with an individual indicating that the individual is at an entrance to smart parking lot 1110.

At step 1320, smart parking lot system 1100 identifies an individual associated with the vehicle. In various embodiments, step 1320 includes smart parking lot system 1100 receiving sensor data from sensors 1116. For example, sensors 1116 may capture an image of the vehicle and send the image to smart parking lot system 1100. In various embodiments, smart parking lot system 1100 may use image recognition to identify a license plate number from the image. Additionally or alternatively, smart parking lot system 1100 may use image recognition to identify a biometric feature associated with an individual in the vehicle. For example, smart parking lot system 1100 may use facial recognition to identify a face of a driver of the vehicle. In various embodiments, step 1320 includes querying a database (e.g., entity graph 170, a digital twin, etc.) using the sensor data. For example, smart parking lot system 1100 may receive image data, apply image recognition to identify a license plate number from the image data, and query entity graph 170 with the license plate number to identify an individual associated with the license plate number. As a further example, smart parking lot system 1100 may receive image data from sensors 1116, apply facial recognition to identify facial features from the image data, and query a database including digital twins to identify an individual based on the facial features. Additionally or alternatively, smart parking lot system 1100 may identify an individual associated with the vehicle using an identifier associated with the vehicle and/or the individual. For example, sensors 1116 may receive a NFC signal from a device associated with the vehicle and may query entity graph 170 using information from the NFC signal to identify the individual. As a further example, sensors 1116 may receive an identifier (e.g., a scanned barcode, etc.) from a mobile device associated with the individual (e.g., client devices 40, etc.) and query entity graph 170 using the identifier to identify the individual.

In various embodiments, method 1300 includes steps 1310 and 1320 or steps 1330 and 1340. In some embodiments, method 1300 includes steps 1310, 1320, 1330, and 1340. For example, method 1300 may vary depending on how an individual arrives at smart parking lot 1110 (e.g., the individual drives to smart parking lot 1110, the individual is dropped off at smart parking lot 1110, etc.). At step 1330, smart parking lot system 1100 detects an individual near a parking lot. In various embodiments, the parking lot is smart parking lot 1110. In various embodiments, step 1330 includes receiving sensor data from sensors 1116. For example, smart parking lot system 1100 may receive image data from sensors 1116 and use image recognition to determine the presence of an individual. In some embodiments, step 1330 includes detecting a mobile device associated with the individual. For example, sensors 1116 may receive NFC communication from a mobile phone associated with the individual.

At step 1340, smart parking lot system 1100 identifies the individual. For example, smart parking lot system 1100 may query entity graph 170 to identify a digital twin associated with the individual. In some embodiments, smart parking lot system 1100 may receive image data from sensors 1116, apply facial recognition on the image data to identify facial features, and query entity graph 170 using the facial features to identify an individual. As another example, smart parking lot system 1100 may receive an identifier from a mobile device associated with the individual (e.g., via NFC, etc.) and query entity graph 170 using the identifier to identify the individual.

At step 1350, smart parking lot system 1100 retrieves context information corresponding to the individual. In various embodiments, step 1350 includes retrieving a digital twin associated with the individual. For example, smart parking lot system 1100 may query entity graph 170 to retrieve a digital twin associated with the individual including context information. In various embodiments, the digital twin includes information describing the individual (e.g., context information, etc.). For example, the digital twin may include a schedule of the individual, physical characteristics of the individual (e.g., weight, hair color, facial features, physical impairments, etc.), an organizational role of the individual, an assigned parking space associated with the individual, health information associated with the individual, and/or any other information describing the individual. In some embodiments, the context information includes an indication of interested persons. For example, the individual may be a visitor and the context information may include a host of the visitor. In some embodiments, an employee may send a calendar invitation to a visitor to schedule a meeting, the visitor may register for the meeting, smart parking lot system 1100 may detect the visitor arrive at smart parking lot 1110, and smart parking lot system 1100 may retrieve context information associated with the visitor including an identity of the employee that invited the visitor.

At step 1360, smart parking lot system 1100 identifies interested persons based on the context information. For example, smart parking lot system 1100 may identify a host associated with the individual. As an additional example, smart parking lot system 1100 may identify meeting attendees associated with an event on a schedule of the individual. As yet another example, smart parking lot system 1100 may identify an assistant associated with the individual. In various embodiments, the interested persons include anyone interested in knowing about the arrival of the individual. In some embodiments, the interested persons are determined by user preferences associated with the individual. In some embodiments, smart parking lot system 1100 may query a digital twin associated with the identified individual to determine the interested persons. In some embodiments, smart parking lot system 1100 identified a single interested person. Additionally or alternatively, smart parking lot system 1100 may identify multiple interested persons.

At step 1370, smart parking lot system 1100 provides the interested persons an indication that the individual has arrived in the parking lot. For example, smart parking lot system 1100 may sent a notification to mobile devices associated with the interested persons. In various embodiments, the notification is customized. In some embodiments, the notification facilitates communication between the interested persons and the individual. For example, smart parking lot system 1100 may send an email to an interested person associated with the individual, the interested person may reply to the email with a personalized message to the individual, and smart parking lot system 1100 may display the personalized message on digital displays in smart parking lot 1110 for viewing by the individual. In various embodiments, the indication includes location information. For example, the indication may be a push notification on a mobile device that includes a current location of the individual (e.g., what parking space they are at, etc.).

Figure 7:
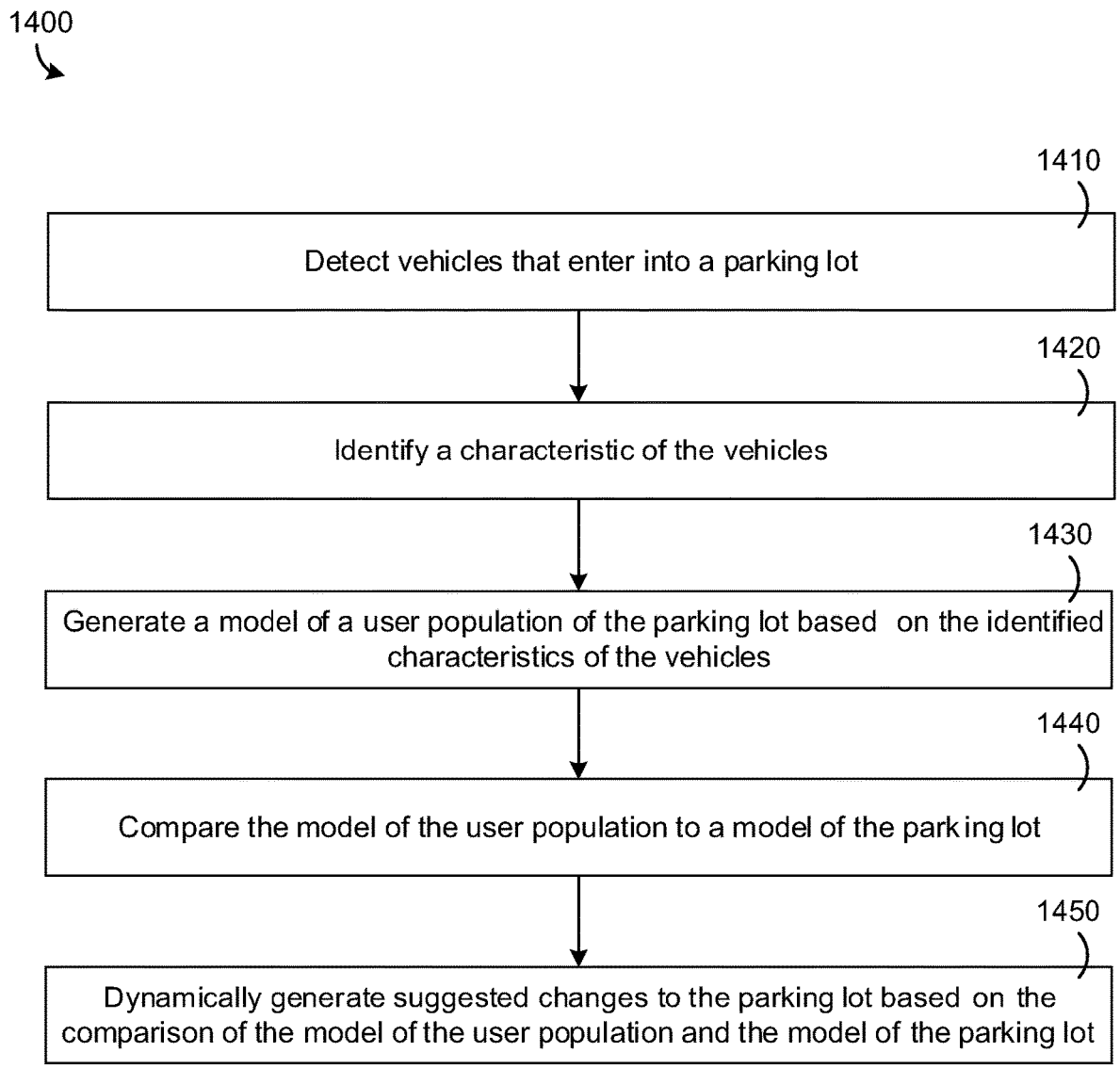
FIG. 7 is a flow diagram of a method of dynamically generating suggested changes for a parking lot, according to an exemplary embodiment.

Referring now to FIG. 7, a method 1400 of dynamically generating suggested changes for a parking lot is shown, according to an embodiment. In various embodiments, smart parking lot system 1100 at least partially implements method 1400. At step 1410, smart parking lot system 1100 detects a vehicle that enters into a parking lot. In various embodiments, the parking lot is smart parking lot 1110. In various embodiments, step 1410 includes smart parking lot system 1100 receiving sensor data from sensors 1116. For example, a motion detector positioned near an entrance to smart parking lot 1110 may detect a vehicle entering smart parking lot 1110 and send an indication to smart parking lot system 1100. Additionally or alternatively, smart parking lot system 1100 may receive position data from a mobile device associated with a vehicle and/or individual. For example, smart parking lot system 1100 may receive GPS data from a client device 40 associated with an individual indicating that the individual is at an entrance to smart parking lot 1110.

At step 1420, smart parking lot system 1100 identifies a characteristic of the vehicle. For example, smart parking lot system 1100 may identify a make and model of the vehicle. Additionally or alternatively, smart parking lot system 1100 may identify characteristics of users of the vehicle. In some embodiments, smart parking lot system 1100 may receive image data from sensors 1116, apply image recognition to identify features of the vehicle (e.g., headlights shape, size, color, grill pattern, badge, etc.), and analyze (e.g., query a database, etc.) the features to determine a make and model of the vehicle. As a further example, smart parking lot system 1100 may receive identifying information from an individual associated with the vehicle (e.g., by scanning a QR code, etc.) and further receive sensor data from sensors 1116 (e.g., weight data, image data, etc.), retrieve context information associated with the individual based on the identifying information (e.g., by querying entity graph 170, etc.), identify a vehicle associated with the individual based on the context information, verify that the vehicle identified from the context information is the vehicle the individual is currently driving (e.g., by comparing the vehicle information with sensor data, etc.), and retrieve characteristics associated with the vehicle from the context information. In some embodiments, smart parking lot system 1100 updates a database using the identified characteristics of the vehicle and/or the identified characteristics of the users of the vehicle. For example, smart parking lot system 1100 may identify an individual having a new vehicle and may update entity graph 170 to reflect the individual's new vehicle.

At step 1430, smart parking lot system 1100 generates a model of a user population of the parking lot based on the identified characteristics of the vehicles. For example, smart parking lot system 1100 may build and/or update a digital twin of smart parking lot 1110 including make and model information for each of the vehicles in smart parking lot 1110. Additionally or alternatively, smart parking lot system 1100 may generate a model of usage of the parking lot. For example, the model may describe trends in parking lot usage such as usage demand, a distribution of space rentals, types of vehicles using the parking lot, etc. In various embodiments, the model includes timeseries data. For example, the model may reflect changes in the user population over time. In some embodiments, a digital twin of smart parking lot 1110 may indicate that a black car and a red van were parked in smart parking lot 1110 at parking spaces #10 and #293 respectively at 11:00 AM and that the black car left smart parking lot 1110 at 11:04 AM.

At step 1440, smart parking lot system 1100 compares the model of the user population to a model of the parking lot. For example, smart parking lot system 1100 may compare physical features of smart parking lot 1110 included in a digital twin of smart parking lot 1110 to a user population of smart parking lot 1110 included in the digital twin of smart parking lot 1110. Additionally or alternatively, smart parking lot system 1100 may compare a model of usage of the parking lot to a model of the parking lot. In some embodiments, smart parking lot system 1100 may compare a number of vehicles regularly using smart parking lot 1110 as indicated by the user population included in a digital twin of smart parking lot 1110 to a number of parking spaces in smart parking lot 1110 as indicated by physical features of smart parking lot 1110 included in the digital twin of smart parking lot 1110. As a further example, smart parking lot system 1100 may compare a trend in a number of electric vehicles (e.g., via timeseries data, etc.) using smart parking lot 1110 as indicated the user population included in a digital twin of smart parking lot 1110 to a number of available electric vehicle charging stations for smart parking lot 1110 as indicated by physical features of smart parking lot 1110 included in the digital twin of smart parking lot 1110.

At step 1450, smart parking lot system 1100 dynamically generates suggested changes to the parking lot based on the comparison of the model of the user population and the model of the parking lot. For example, smart parking lot system 1100 may generate a suggestion to increase a number of electric vehicle charging stations in smart parking lot 1110 based on a comparison indicating that a number of electric vehicles using smart parking lot 1110 will soon outnumber a number of electric vehicle charging stations available in smart parking lot 1110. As a further example, smart parking lot system 1100 may generate a suggestion to increase a price associated with using smart parking lot 1110 during winter months in response to a comparison that indicates that demand for use of smart parking lot 1110 increases during winter months. Additionally or alternatively, smart parking lot system 1100 may generate suggested changes in a service level associated with the parking lot. For example, smart parking lot system 1100 may generate a suggested change to a non-person related attribute of the parking lot (e.g., a suggestion to install 24-7 video surveillance, etc.).

Figure 8:
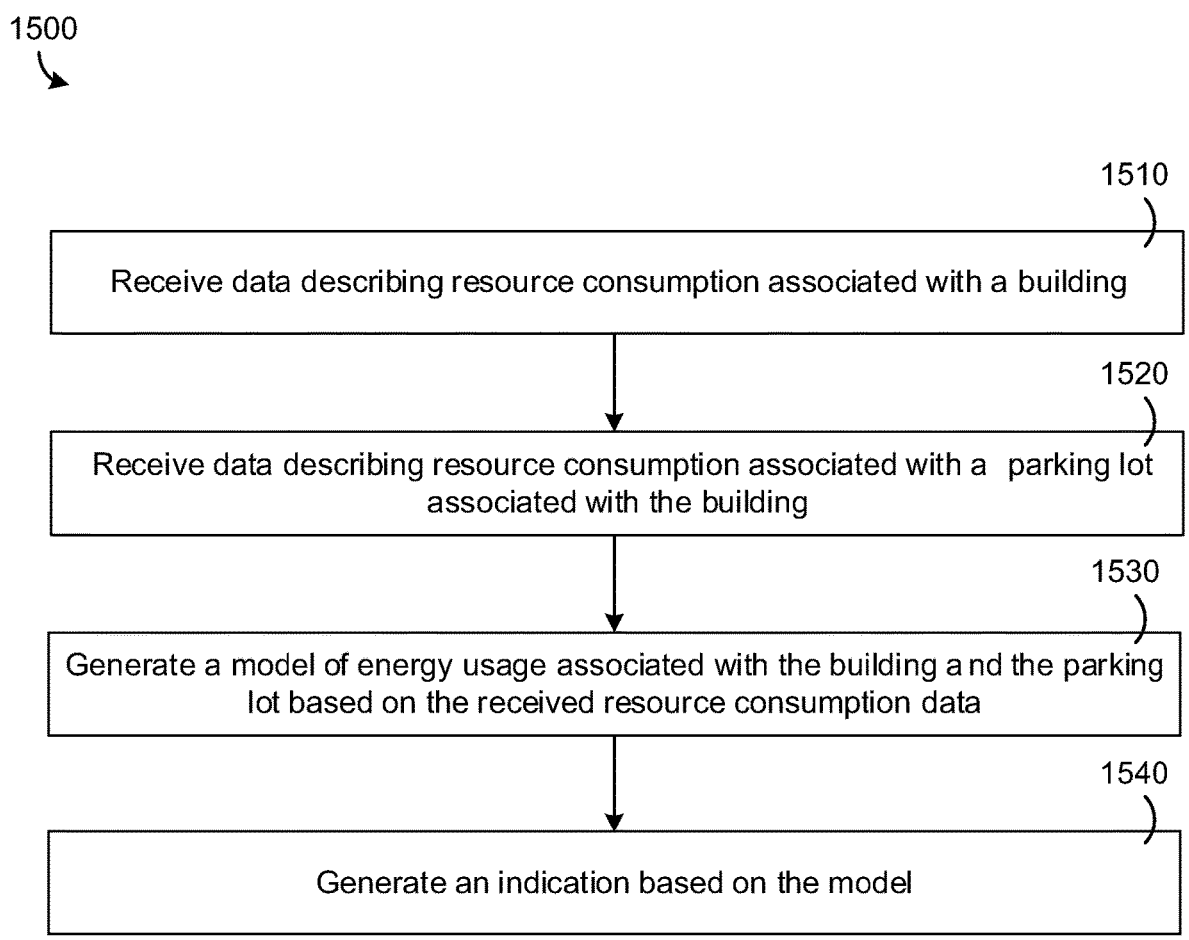
FIG. 8 is a flow diagram of a method of modeling resource consumption in a parking lot, according to an exemplary embodiment.

Referring now to FIG. 8, a method 1500 of modeling resource consumption in a parking lot is shown, according to an embodiment. In various embodiments, smart parking lot system 1100 at least partially implements method 1500. At step 1510, smart parking lot system 1100 receives data describing resource consumption associated with a building. For example, smart parking lot may receive energy usage information associated with building 10. Step 1510 may include receiving energy usage information (e.g., load, etc.), water usage information, processing power usage information, and/or any other resource usage information. For example, smart parking lot system 1100 may receive data describing an electrical load associated with building 10 from a power meter associated with building 10.

At step 1520, smart parking lot system 1100 receives data describing resource consumption associated with a parking lot associated with the building. For example, smart parking lot system 1100 may receive energy usage information associated with smart parking lot 1110. In some embodiments, smart parking lot system 1100 may receive energy usage information from an electric meter associated with smart parking lot 1110. In various embodiments, the data describing resource consumption includes electricity usage information, water usage information, processing power usage information, and/or any other resource usage information.

At step 1530, smart parking lot system 1100 generates a model of energy usage associated with the building and the parking lot based on the received resource consumption data. In various embodiments, the model is associated with usage of another resource (e.g., water, processing power, etc.). In various embodiments, the model may include information describing a transfer of power between building 10 and smart parking lot 1110. For example, the model may describe a distribution and usage of electrical power within a system including building 10 and smart parking lot 1110. In various embodiments, the model is an optimization model. For example, the model may be used by an energy optimization system (e.g., electrical subsystem 126, etc.) to determine efficient energy usage within the system.

At step 1540, smart parking lot system 1100 generates an indication based on the model. For example, smart parking lot system 1100 may analyze the model to determine that smart parking lot 1110 cannot support electric vehicle charging today (e.g., because of high loads associated with building 10, power savings limits, etc.) and may generate a notification for users of smart parking lot 1110 indicating that electric vehicle charging will not be offered today. In some embodiments, the indication includes actions. For example, the indication may include disabling electric vehicle charging stations associated with smart parking lot 1110. In some embodiments, step 1540 occurs in response to receiving a signal from an external system. For example, smart parking lot system 1100 may receive a control signal from an energy management system (e.g., electrical subsystem 126, etc.) and generate a notification in response to receiving the control signal. In various embodiments, step 1540 includes transmitting the indication to individuals (e.g., users of smart parking lot 1110, etc.). Additionally or alternatively, step 1540 may include controlling resource consumption associated with smart parking lot 1110. For example, smart parking lot system 1100 may turn off an in-ground heating system associated with smart parking lot 1110 to reduce energy consumption associated with smart parking lot 1110. As an additional example, smart parking lot system 1100 may transfer energy to building 10 in response to determining that building 10 has an unusually high load and requires additional power.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The term "client" or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

The present disclosure may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. One or more non-transitory computer-readable storage media having instructions stored thereon that, when executed by one or more processors, cause the one or more processors to:
   detect a vehicle that enters into a parking lot;
   identify an individual associated with the vehicle;
   retrieve context information corresponding to the individual from an entity graph responsive to identifying the individual, the entity graph comprising a plurality of nodes representing entities and a plurality of edges representing relationships between the entities;
   dynamically determine a first parking space based on the context information and available parking spaces; and
   provide the individual with directions to the first parking space.

2. The one or more non-transitory computer-readable storage media of claim 1, wherein the context information includes a schedule having events associated with the individual.

3. The one or more non-transitory computer-readable storage media of claim 2, wherein dynamically determining the first parking space further includes determining the first parking space based on a time associated with a next event on the schedule of events.

4. The one or more non-transitory computer-readable storage media of claim 3, wherein dynamically determining the first parking space further includes determining the first parking space based on a physical location of the next event on the schedule of events.

5. The one or more non-transitory computer-readable storage media of claim 2, wherein the context information includes an organizational role of the individual, and wherein dynamically determining the first parking space further includes determining the first parking space based on the organizational role of the individual.

6. The one or more non-transitory computer-readable storage media of claim 1, wherein the context information includes a physical characteristic of the individual.

7. The one or more non-transitory computer-readable storage media of claim 1, wherein detecting the vehicle includes recognizing a license plate of the vehicle.

8. The one or more non-transitory computer-readable storage media of claim 1, wherein providing the individual with directions to the first parking space further includes transmitting the directions to a device associated with the individual.

9. The one or more non-transitory computer-readable storage media of claim 1, wherein dynamically determining the first parking space further includes determining the first parking space based on a plurality of schedules associated with a plurality of individuals, wherein each of the plurality of schedules indicates that the associated individual is visiting a space associated with the parking lot.

10. A system for providing information in a parking environment, comprising:
    one or more processing circuits, each processing circuit including one or more processors and one or more memories having instructions stored thereon that, when executed by the one or more processors, cause the one or more processors to:
    receive a plurality of schedules associated with a plurality of individuals, the plurality of schedules indicating that the plurality of individuals are scheduled to visit a parking lot;
    detect a vehicle that enters into the parking lot;
    identify an individual associated with the vehicle;
    retrieve context information corresponding to the individual responsive to identifying the individual;
    dynamically determine a first parking space based on the context information, the plurality of schedules, and available parking spaces; and
    provide the individual with directions to the first parking space.

11. The system of claim 10, wherein the context information includes a schedule having events associated with the individual.

12. The system of claim 11, wherein dynamically determining the first parking space further includes determining the first parking space based on a time associated with a next event on the schedule of events.

13. The system of claim 12, wherein dynamically determining the first parking space further includes determining the first parking space based on a physical location of the next event on the schedule of events.

14. The system of claim 11, wherein the context information includes an organizational role of the individual, and wherein dynamically determining the first parking space further includes determining the first parking space based on the organizational role of the individual.

15. The system of claim 10, wherein the context information includes a physical characteristic of the individual.

16. The system of claim 10, wherein detecting the vehicle includes recognizing a license plate of the vehicle.

17. The system of claim 10, wherein providing the individual with directions to the first parking space further includes transmitting the directions to a device associated with the individual.

18. A method for providing information in a parking environment, comprising:
- detecting, using image data from an imaging device, a vehicle that enters into a parking lot by identifying a license plate of the vehicle;
- identifying an individual associated with the vehicle based on the license plate;
- retrieving context information corresponding to the individual responsive to identifying the individual, wherein the context information includes an organizational role of the individual;
- dynamically determining a first parking space based on the context information including the organizational role of the individual and available parking spaces; and
- providing the individual with directions to the first parking space.

* * * * *